(12) United States Patent
Hayase et al.

(10) Patent No.: US 7,267,910 B2
(45) Date of Patent: Sep. 11, 2007

(54) CHEMICAL BATTERY CONTAINING GEL ELECTROLYTE BASED ON CROSSLINKED EPOXY COMPOUND HAVING AN ALICYCLIC STRUCTURE

(75) Inventors: Shuzi Hayase, Yokohama (JP); Norio Takami, Yokohama (JP); Hirohisa Miyamoto, Kamakura (JP); Satoshi Mikoshiba, Yamato (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 412 days.

(21) Appl. No.: 10/423,922

(22) Filed: Apr. 28, 2003

(65) Prior Publication Data

US 2003/0228521 A1    Dec. 11, 2003

Related U.S. Application Data

(62) Division of application No. 09/748,007, filed on Dec. 27, 2000, now Pat. No. 6,686,095.

(30) Foreign Application Priority Data

Dec. 28, 1999 (JP) ............................. 11-374997

(51) Int. Cl.
    *H01M 6/14* (2006.01)
(52) U.S. Cl. ............... 429/300; 429/303; 429/314; 429/317
(58) Field of Classification Search ............... 429/300, 429/303, 310, 311, 317, 189; 549/512, 539; 252/62.2
    See application file for complete search history.

(56) References Cited

U.S. PATENT DOCUMENTS

| 4,486,350 A | * | 12/1984 | Bauer et al. ................ 540/140 |
| 5,925,283 A | | 7/1999 | Taniuchi et al. |
| 6,743,877 B1 | * | 6/2004 | Armand et al. ............. 526/258 |

FOREIGN PATENT DOCUMENTS

| JP | 61-023944 | | 6/1986 |
| JP | 62-135467 | * | 6/1987 |
| JP | 03-297006 | | 12/1991 |
| JP | 05-326019 | * | 10/1993 |
| JP | 05-326019 | | 12/1993 |
| JP | 7-032022 | | 4/1995 |
| JP | 11-073819 | | 3/1999 |
| JP | 11073819 | | 3/1999 |
| JP | 11-269762 | | 8/1999 |
| JP | 2000-113872 | | 4/2000 |
| WO | WO99/49531 | | 9/1999 |

* cited by examiner

*Primary Examiner*—Raymond Alejandro
(74) *Attorney, Agent, or Firm*—Oblon, Spivak, McClelland, Maier & Neustadt, P.C.

(57) ABSTRACT

A chemical battery, comprising a positive electrode, a negative electrode, and a gel electrolyte containing a crosslinked body and an electrolyte, the crosslinked body being obtained by crosslinking at least one compound selected from the group consisting of an epoxy compound having an alicyclic structure and at least one epoxy group in a single molecule and an alicyclic epoxy resin.

1 Claim, 2 Drawing Sheets

US 7,267,910 B2

CHEMICAL BATTERY CONTAINING GEL ELECTROLYTE BASED ON CROSSLINKED EPOXY COMPOUND HAVING AN ALICYCLIC STRUCTURE

This application is a Division of application Ser. No. 09/748,007, Filed on Dec. 27, 2000, now U.S. Pat. No. 6,686,095, which was published in English.

CROSS-REFERENCE TO RELATED APPLICATIONS

This application is based upon and claims the benefit of priority from the prior Japanese Patent Application No. 11-374997, filed Dec. 28, 1999, the entire contents of which are incorporated herein by reference.

BACKGROUND OF THE INVENTION

The present invention relates to a gel electrolyte precursor, a chemical battery comprising a gel electrolyte obtained from the gel electrolyte precursor, and a method of manufacturing the chemical battery.

A nonaqueous electrolyte secondary battery, which is an example of the chemical battery, comprises an electrode group including a positive electrode, a negative electrode, and a separator interposed between the positive electrode and the negative electrode, and a nonaqueous electrolyte held by the electrode group. Used as the positive electrode active material is, for example, a lithium-containing complex oxide. Also, the negative electrode is formed of, for example, lithium, a lithium alloy, or a carbonaceous material absorbing-desorbing lithium. On the other hand, a liquid nonaqueous electrolyte prepared by dissolving a lithium salt as an electrolyte in a nonaqueous solvent such as propylene carbonate or γ-butyrolactone is used as the nonaqueous electrolyte.

In recent years, it is required to increase the capacity of the battery, to make the battery thinner and to increase the active area of the battery in accordance with miniaturization, reduction in thickness and improvement in the performance of electronic appliances. It is proposed to use a film material such as a laminate film in place of a metal can as a vessel for housing the electrode group in an attempt to decrease the thickness of the nonaqueous electrolyte secondary battery and to make the secondary battery light in weight. In the case of using a film material, however, the liquid nonaqueous electrolyte tends to leak to the outside. Also, the distribution of the nonaqueous electrolyte within the electrode group tends to be nonuniform. As a result, a problem is generated that the cycle characteristics are lowered. In order to avoid the particular problem, it is studied to impart viscosity to the liquid nonaqueous electrolyte so as to lower the fluidity of the liquid nonaqueous electrolyte.

For example, Japanese Patent Publication (Kokoku) No. 61-23944 discloses a solid composition having an ionic conductivity, comprising an electrolyte consisting of ions of metals belonging to Group I and/or Group II of the Periodic Table, an organic high molecular weight compound having a relative dielectric constant smaller than 4, and an organic solvent having an excellent solubility in respect of the electrolyte and the organic high molecular weight compound noted above and also having a relative dielectric constant smaller than 10. It is disclosed that the solid composition having an ionic conductivity contains the electrolyte in an amount sufficient for imparting an ionic conductivity of at least about $10^{-10} S \cdot cm^{-1}$ to the composition and in an amount not larger than 90 mol % of the solid composition. It is also disclosed that it is desirable to use resins other than thermosetting resins as the organic high molecular weight compound. Particularly, it is disclosed that a satisfactory result can be obtained in the case of using as the organic high molecular weight compound a thermoplastic resin having a one dimensional structure such as polymethyl methacrylate.

However, the solid composition having an ionic conductivity, which is disclosed in the prior art quoted above, has an ionic conductivity of about 10-10 to $10^{-7} S \cdot cm^{-1}$, which is lower than that of the liquid nonaqueous electrolyte, and is not satisfactory in the electrochemical stability.

BRIEF SUMMARY OF THE INVENTION

An object of the present invention is to provide a gel electrolyte precursor capable of providing a gel electrolyte having a high ionic conductivity and a high adhesion to the electrode.

Another object of the present invention is to provide a chemical battery exhibiting improved charge-discharge cycle characteristics and comprising a gel electrolyte having a high adhesion force to the electrolyte and an improved ionic conductivity.

Still another object of the present invention is to provide a method of manufacturing a chemical battery exhibiting improved charge-discharge cycle characteristics and comprising a gel electrolyte having a high adhesion force to the electrolyte and an improved ionic conductivity.

According to a first aspect of the present invention, there is provided a first gel electrolyte precursor, comprising a gelling agent containing at least one kind of a compound selected from the group consisting of an epoxy compound having an alicyclic structure and at least one epoxy group in a single molecule and an alicyclic epoxy resin, and an electrolyte.

According to a second aspect of the present invention, there is provided a second gel electrolyte precursor, comprising:

an electrolyte;

a halogen-containing compound;

and a compound containing at least one kind of an element selected from the group consisting of N, P and S and capable of reaction with the halogen-containing compound to form an onium salt;

wherein the halogen-containing compound contains at least one kind of the compounds represented by chemical formula (A) to chemical formula (G) given below:

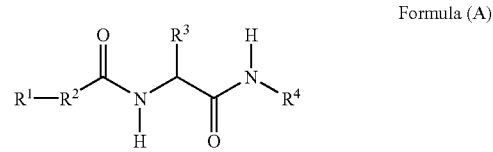

Formula (A)

where $R^1$ represents an organic group having a halogen atom or a halogen atom, $R^2$ represents a divalent organic group, $R^3$ represents a monovalent organic group, and $R^4$ represents a monovalent organic group;

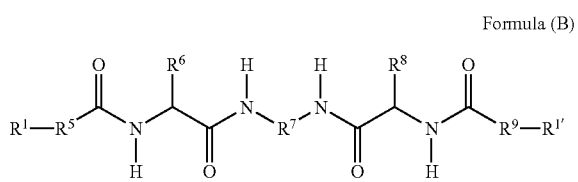
Formula (B)

where $R^1$ represents an organic group having a halogen atom or a halogen atom, $R^{1'}$ represents an organic group having a halogen atom or a halogen atom, $R^5$ represents a divalent organic group, $R^6$ represents a monovalent organic group, $R^7$ represents a divalent organic group, $R^8$ represents a monovalent organic group, and $R^9$ represents a divalent organic group;

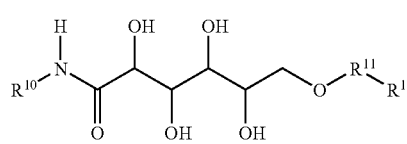
Formula (C)

where $R^1$ represents an organic group having a halogen atom or a halogen atom, $R^{10}$ represents a monovalent organic group, and $R^{11}$ represents a divalent organic group;

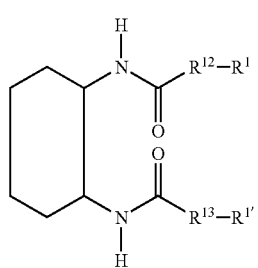
Formula (D)

where $R^1$ represents an organic group having a halogen atom or a halogen atom, $R^{1'}$ represents an organic group having a halogen atom or a halogen atom, $R^{12}$ represents a divalent organic group, and $R^{13}$ represents a divalent organic group;

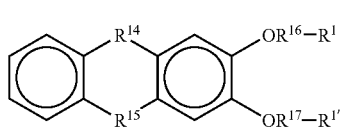
Formula (E)

where $R^1$ represents an organic group having a halogen atom or a halogen atom, $R^{1'}$ represents an organic group having a halogen atom or a halogen atom, $R^{14}$ represents —(C=O)— or —CH—, $R^{15}$ represents —(C=O)— or —CH—, $R^{16}$ represents a divalent organic group, and $R^{17}$ represents a divalent organic group;

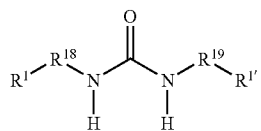
Formula (F)

where $R^1$ represents an organic group having a halogen atom or a halogen atom, $R^{1'}$ represents an organic group having a halogen atom or a halogen atom, $R^{18}$ represents a divalent organic group, and $R^{19}$ represents a divalent organic group;

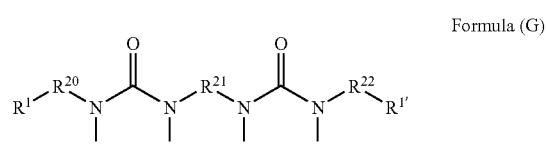
Formula (G)

where $R^1$ represents an organic group having a halogen atom or a halogen atom, $R^{1'}$ represents an organic group having a halogen atom or a halogen atom, $R^{20}$ represents a divalent organic group, $R^{21}$ represents a monovalent organic group, and $R^{22}$ represents a divalent organic group.

According to a third aspect of the present invention, there is provided a second gel electrolyte precursor, comprising:
an electrolyte;
a halogen-containing compound;
and a compound containing at least one kind of an element selected from the group consisting of N, P and S and capable of reaction with the halogen-containing compound to form an onium salt;
wherein the compound containing at least one kind of an element selected from the group consisting of N, P and S contains at least one kind of the compounds represented by chemical formula (H) to chemical formula (N) given below:

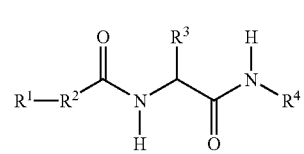
Formula (H)

where $R^1$ represents an atomic group containing at least one kind of an atom selected from the group consisting of N, P and S, $R^2$ represents a divalent organic group, $R^3$ represents a monovalent organic group, and $R^4$ represents a monovalent organic group;

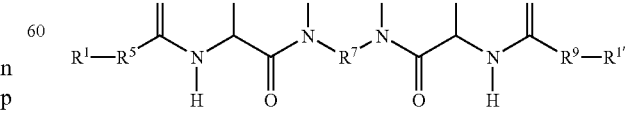
Formula (I)

where $R^1$ represents an atomic group containing at least one kind of an atom selected from the group consisting of N, P and S, $R^{1'}$ represents an atomic group containing at least one kind of an atom selected from the group consisting of N, P and S, $R^5$ represents a divalent organic group, $R^6$ represents a monovalent organic group, $R^7$ represents a divalent organic group, $R^8$ represents a monovalent organic group and $R^9$ represents a divalent organic group;

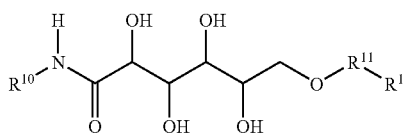

Formula (J)

where $R^1$ represents an atomic group containing at least one kind of an atom selected from the group consisting of N, P and S, $R^{10}$ represents a monovalent organic group, and $R^{11}$ represents a divalent organic group;

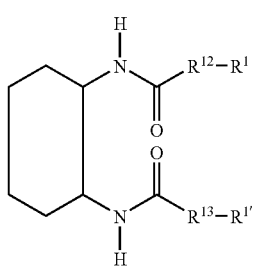

Formula (K)

where $R^1$ represents an atomic group containing at least one kind of an atom selected from the group consisting of N, P and S, $R^{1\prime}$ represents an atomic group containing at least one kind of an atom selected from the group consisting of N, P and S, $R^{12}$ represents a divalent organic group, and $R^{13}$ represents a divalent organic group;

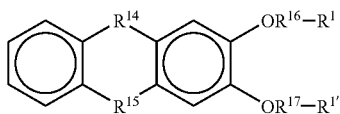

Formula (L)

where $R^1$ represents an atomic group containing at least one kind of an atom selected from the group consisting of N, P and S, $R^{1\prime}$ represents an atomic group containing at least one kind of an atom selected from the group consisting of N, P and S, $R^{14}$ represents —(C=O)— or —CH—, $R^{15}$ represents —(C=O)— or —CH—, $R^{16}$ represents a divalent organic group, and $R^{17}$ represents a divalent organic group;

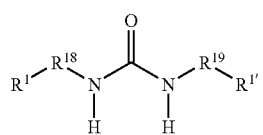

Formula (M)

where $R^1$ represents an atomic group containing at least one kind of an atom selected from the group consisting of N, P and S, $R^{1\prime}$ represents an atomic group containing at least one kind of an atom selected from the group consisting of N, P and S, $R^{18}$ represents a divalent organic group, and $R^{19}$ represents a divalent organic group;

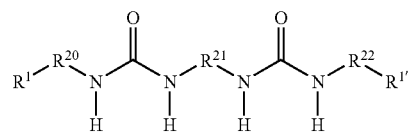

Formula (N)

where $R^1$ represents an atomic group containing at least one kind of an atom selected from the group consisting of N, P and S, $R^{1\prime}$ represents an atomic group containing at least one kind of an atom selected from the group consisting of N, P and S, $R^{20}$ represents a divalent organic group, $R^{21}$ represents a monovalent organic group, and $R^{22}$ represents a divalent organic group.

According to a fourth aspect of the present invention, there is provided a second gel electrolyte precursor, comprising:

an electrolyte;
a halogen-containing compound;
and a compound containing at least one kind of an element selected from the group consisting of N, P and S and capable of reaction with the halogen-containing compound to form an onium salt;

wherein the halogen-containing compound contains at least one kind of the compound selected from the compounds represented by chemical formula (A) to chemical formula (G), and the compound containing at least one kind of an element selected from the group consisting of N, P and S contains at least one kind of the compound selected from the compounds represented by chemical formula (H) to chemical formula (N).

According to a fifth aspect of the present invention, there is provided a first chemical battery, comprising:

a positive electrode;
a negative electrode; and
a gel electrolyte comprising a crosslinked body and an electrolyte, the crosslinked body being obtained by crosslinking at least one kind of the compound selected from the group consisting of an epoxy compound having an alicyclic structure and at least one epoxy group in a single molecule and an alicyclic epoxy resin.

According to a sixth aspect of the present invention, there is provided a first chemical battery, comprising:

a positive electrode;
a negative electrode;
a separator interposed between the positive electrode and the negative electrode; and
a gel electrolyte comprising a crosslinked body and an electrolyte, the crosslinked body being obtained by crosslinking at least one kind of the compound selected from the group consisting of an epoxy compound having an alicyclic structure and at least one epoxy group in a single molecule and an alicyclic epoxy resin, the gel electrolyte being present in at least a part of the interface between the positive electrode and the separator and in at least a part of the interface between the negative electrode and the separator.

According to a seventh aspect of the present invention, there is provided a second chemical battery, comprising:

a positive electrode;
a negative electrode; and
a gel electrolyte comprising a polymer of an onium salt formed by the reaction between a halogen-containing compound and a compound containing at least one kind of an element selected from the group consisting of N, P and S and an electrolyte;

wherein the halogen-containing compound contains at least one kind of a compound selected from the compounds represented by chemical formula (A) to chemical formula (G).

According to an eighth aspect of the present invention, there is provided a second chemical battery, comprising:

a positive electrode;

a negative electrode; and a gel electrolyte comprising a polymer of an onium salt formed by the reaction between a halogen-containing compound and a compound containing at least one kind of an element selected from the group consisting of N, P and S and an electrolyte;

wherein the compound containing at least one kind of an element selected from the group consisting of N, P and S contains at least one kind of a compound selected from the compounds represented by chemical formula (H) to chemical formula (N).

According to a ninth aspect of the present invention, there is provided a second chemical battery, comprising:

a positive electrode;

a negative electrode; and a gel electrolyte comprising a polymer of an onium salt formed by the reaction between a halogen-containing compound and a compound having at least one element selected from the group consisting of N, P, and S, and an electrolyte, wherein the halogen-containing compound contains at least one kind of a compound selected from the compounds represented by chemical formula (A) to chemical formula (G), and the compound containing at least one kind of an element selected from the group consisting of N, P and S contains at least one kind of a compound selected from the compounds represented by chemical formula (H) to chemical formula (N).

According to a tenth aspect of the present invention, there is provided a third chemical battery, comprising a positive electrode, a negative electrode, and a gel electrolyte present between the positive electrode and the negative electrode, wherein the gel electrolyte comprises an electrolyte retaining polymer and an electrolyte held by the electrolyte retaining polymer, the electrolyte retaining polymer contains a crosslinked body prepared by crosslinking an epoxy resin having at least one ethylene oxide unit, at least one hydrogen atom of each of the methylene group of the ethylene oxide unit being substituted by an alkyl group.

In the third chemical battery of the present invention, it is possible for the gel electrolyte to be brought into contact with the positive electrode or the negative electrode so as to perform the function of an adhesive layer.

It is possible for the third chemical battery of the present invention to further comprise a hermetic vessel housing the electrolyte retaining polymer, the positive electrode, the negative electrode and an electrode lead. It is also possible for the electrolyte retaining polymer to be brought into contact with at least a part of the hermetic vessel or the electrode lead.

In the third chemical battery of the present invention, it is desirable for the phase of the electrolyte retaining polymer to be separated from the phase of the electrolyte.

In the third chemical battery of the present invention, it is possible for a spacer made of a porous body to be interposed between the positive electrode and the negative electrode and to form the gel electrolyte to be formed within the spacer.

In the third chemical battery of the present invention, it is possible for the positive electrode to contain a Li-containing oxide as a positive electrode active substance and for the negative electrode to contain a negative electrode active substance capable of absorbing-desorbing lithium ions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
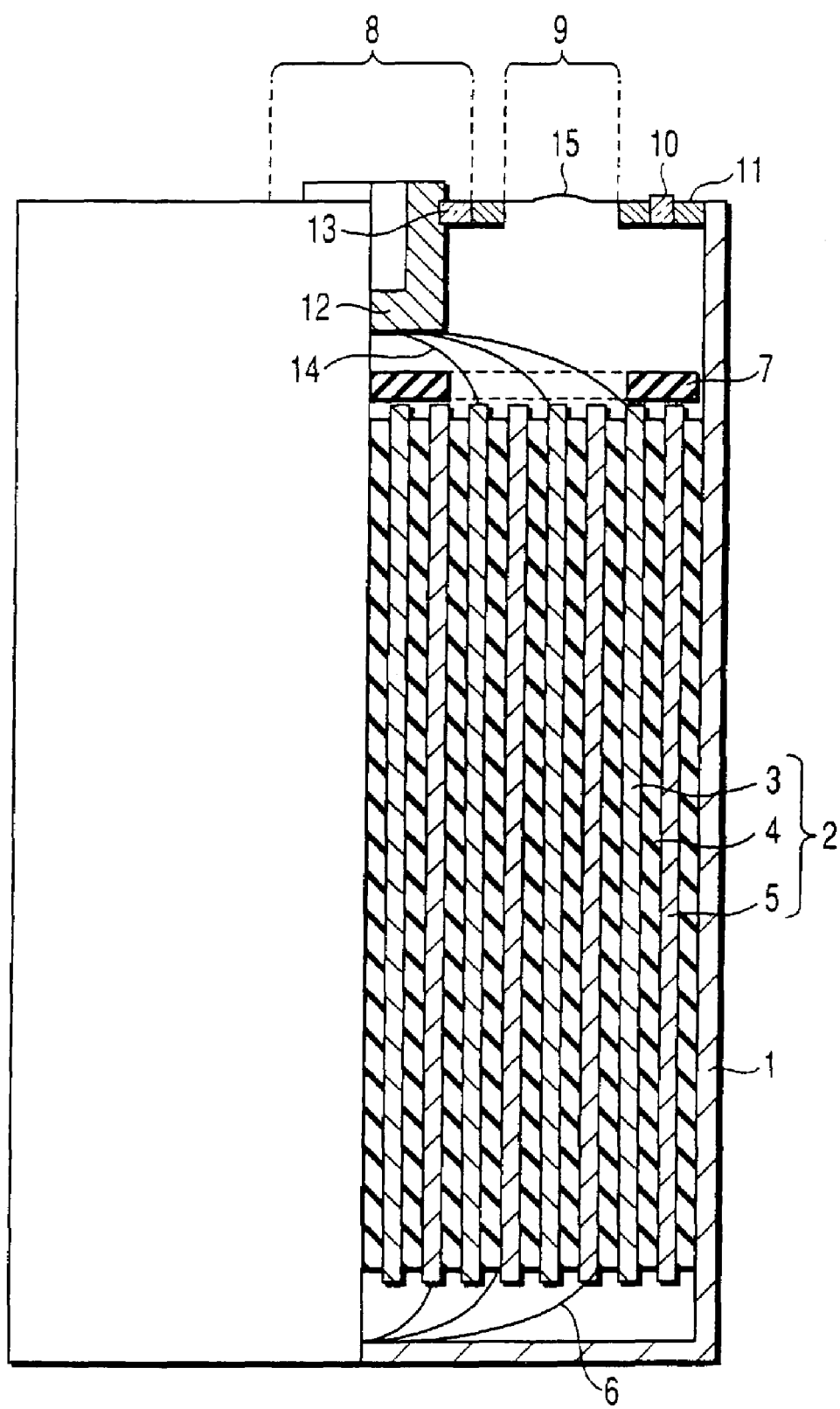
FIG. 1 is a partial cross sectional view showing a cylindrical nonaqueous electrolyte secondary battery as an example of a chemical battery of the present invention.

A first gel electrolyte precursor and a second gel electrolyte precursor of the present invention will now be described.

1. First Gel Electrolyte Precursor:

The first gel electrolyte precursor of the present invention comprises a gelling agent and an electrolyte, said gelling agent containing at least one kind of an epoxy resin selected from the group consisting of an epoxy compound having an alicyclic structure and at least one epoxy group (epoxy ring) represented by chemical formula (1) given below and an alicyclic epoxy resin:

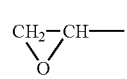

Formula (1)

Also, the gel electrolyte precursor is in the form of a liquid. Incidentally, it is possible for the crosslinked body of the gelling agent performs the function of an electrolyte retaining component.

It is possible for the alicyclic structure of the epoxy compound to consist of carbon atoms bonded to each other to form a cyclic structure. It is also possible for the alicyclic structure of the epoxy compound to include a bridging structure bonded to the main skeleton formed of the carbon atoms bonded to each other to form a cyclic structure. It is desirable for the alicyclic structure not to include an unsaturated bond and it is most desirable for the alicyclic structure to consist of a saturated monocyclic hydrocarbon, because the unsaturated bond tends to induce a side reaction. It is desirable for the number of carbon atoms bonded to each other to form a ring to fall within a range of 3 and 10. It is most desirable for the number of carbon atoms noted above to be 6. The alicyclic structure having a main skeleton consisting of 6 carbon atoms bonded to each other to form a ring includes, for example, cyclohexane ring (cyclohexyl group), a derivative in which another substituent is substituted for some or all of the hydrogen atoms of the cyclohexane ring (cyclohexyl group), and another derivative in which a bridging structure is introduced into the cyclohexane ring (cyclohexyl group). The substituent noted above includes, for example, an alkyl group. 1-methyl cyclohexyl group represented by chemical formula (2) given below is an example of a compound in which another substituent is substituted for one of the hydrogen atoms of the cyclohexyl group:

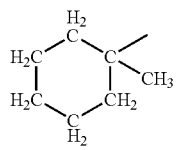

Formula (2)

Examples of a chemical structure in which a bridging structure is introduced into the cyclohexyl group includes bicyclo[3.2.1]octyl, bicyclo butyl, bicyclo[5.2.0]nonyl, bicyclo[4.3.2]undecane, and dicyclopentadienyl.

The epoxy compound used in the present invention includes, for example, a glycidyl ether type epoxy resin formed by the reaction between an alcohol having an alicyclic structure within the molecule and epichlorohydrin, a modified compound of said epoxy resin, and a hydrogenated epoxy resin having a cyclohexane ring (cyclohexyl group) obtained by hydrogenating a bisphenol type glycidyl ether. It is possible for a reactive group such as a vinyl group, an acrylic group or a methacrylic group to be substituted partly in such an epoxy resin. Examples of the epoxy compounds described above include the epoxy compounds represented by chemical formula (3) to (5) given below.

Among the epoxy compounds, it is desirable to use hydrogenated epoxy resin. It is most desirable to use the epoxy resin represented by chemical formula (6) given below:

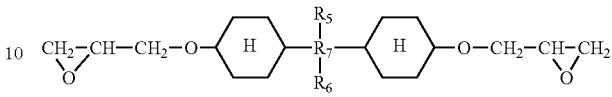

Formula (6)

where $R_5$ is at least one substituent selected from the group consisting of a hydrogen atom and an alkyl group, and $R_6$ is at least one substituent selected from the group consisting of a hydrogen atom and an alkyl group. It is possible for the carbon atom bonded to the cyclohexane ring to be bonded to $R_5$ and $R_6$ to form a ring. The hydrocarbon group having a cyclic structure includes, for example, a cycloalkyl group. Also, $R_7$ represents a substituent selected from the group consisting of C, O, $SO_2$ and CO. It is desirable to use as the alkyl group methyl group, ethyl group or propyl group.

The alicyclic epoxy resin used in the present invention includes, for example, cyclohexane oxide obtained by oxidizing and epoxidizing cyclohexane, a derivative in which polyethylene oxide is substituted for a part of the hydrogen atoms of cyclohexane oxide, cyclopentene oxide obtained by oxidizing and epoxidizing cyclopentene, and an alicyclic epoxy resin obtained by oxidizing and epoxidizing the unsaturated bond present in polyvinyl cyclohexene oxide. It is possible for a reactive group such as a vinyl group, an acrylic group or a methacrylic group to be substituted for a part of such an alicyclic epoxy resin. Among the alicyclic epoxy resins, it is desirable to use cyclohexene oxide represented by chemical formula (7) given below and an alicyclic epoxy resin having a cyclohexene oxide group.

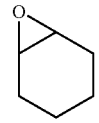

Formula (7)

Formula (3)

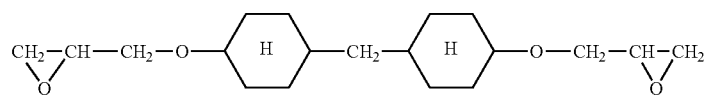

Formula (4)

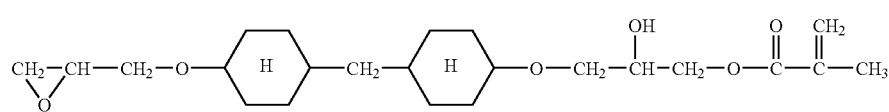

Formula (5)

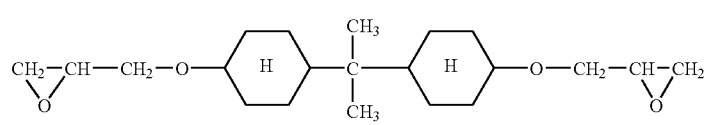

The specific alicyclic epoxy resins having a cyclohexene oxide structure (epoxy group having a cyclohexane ring) include, for example, an alicyclic epoxy resins having a structure represented by chemical formula (8) to (13) given below.

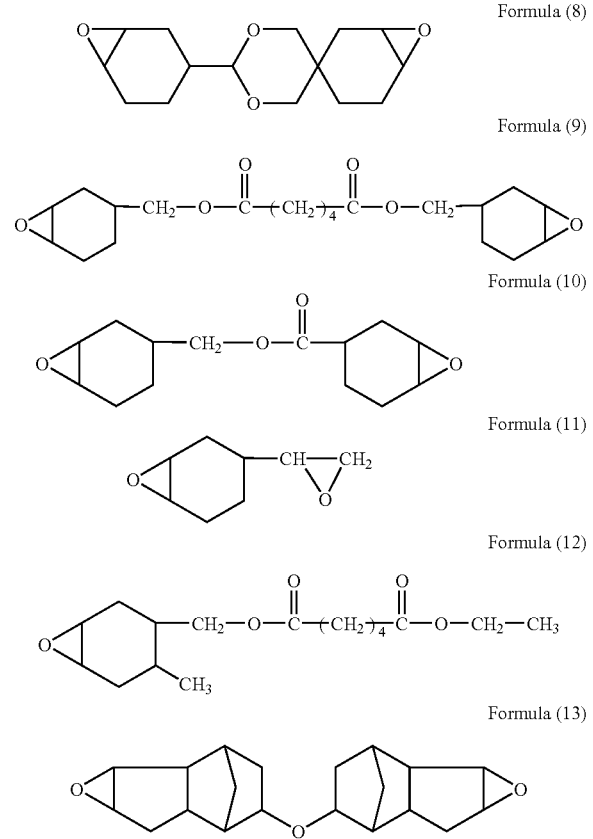

Formula (8)

Formula (9)

Formula (10)

Formula (11)

Formula (12)

Formula (13)

Particularly, the alicyclic epoxy resin having a functional group represented by chemical formula 14-A can be crosslinked without using any of a catalyst and a crosslinking agent. It is most desirable to use an alicyclic epoxy resin having a structural formula represented by chemical formula 14-B, where $R_8$ represents an atomic group having at least one functional group selected from the group consisting of a cyclohexene oxide group, an isopropenyl group, a vinyl group, an acrylic group and a methacrylic group.

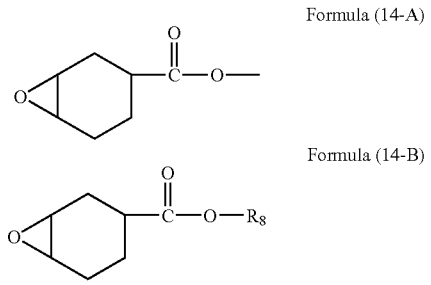

Formula (14-A)

Formula (14-B)

The phase of at least one of the epoxy compound having an alicyclic structure and the alicyclic epoxy resin strongly tends to be separated from the phase of the electrolyte in the gel precursor in the gelling step. In this case, the mutual function ceases to be performed between the electrolyte and the polymer component so as to permit the lithium ions to be migrated smoothly. Particularly, this tendency is strong in a low molecular weight region in which the molecular movement is suppressed. It follows that the gelling can be achieved while maintaining a high ionic conductivity. In other words, the gel electrolyte precursor has a uniform low viscosity in the injection step so as to permit the gel electrolyte precursor to permeate smoothly to reach the electrode. In addition, after the crosslinking, the polymer component is precipitated because of the decrease of the entropy caused by the polymerization so as to promote the phase separation from the electrolyte.

Particularly, the gelling agent the phase of which tends to be separated easily includes an alicyclic epoxy resin having cyclohexane oxide and a compound formed by the condensation reaction between an alcohol having an alkyl group having at least 6 carbon atoms and epichlorohydrin. The degree of phase separation differs depending on the selection of the electrolyte. When it comes to, for example, an alicyclic epoxy resin having cyclohexane oxide, the phase separation tends to take place most easily in the case of selecting an electrolyte prepared by dissolving $LiBF_4$ in a nonaqueous solvent including γ-butyrolactone.

It is desirable for each of the epoxy compound and the alicyclic epoxy resin described above to have an epoxy equivalent falling within a range of between 50 and 500. If the epoxy equivalent is smaller than 50, the cured material obtained by crosslinking the epoxy resin is precipitated in the electrolyte so as to make it difficult to obtain a gel electrolyte. On the other hand, if the epoxy equivalent exceeds 500, the crosslinking reaction fails to take place promptly. It is more desirable for the epoxy equivalent to fall within a range of between 50 and 200.

It is desirable for each of the epoxy compound and the alicyclic epoxy resin described above to have a molecular weight falling within a range of between 100 and 50,000. Where the molecular weight falls within the range noted above, it is possible to decrease the viscosity of the gel electrolyte, with the result that it is possible to increase the permeability of the gel electrolyte precursor into the electrode and the separator. Particularly, it is desirable for the molecular weight to fall within a range of between 100 and 50,000 in the case of manufacturing a first nonaqueous electrolyte secondary battery described herein later. More desirably, the molecular weight should fall within a range of between 200 and 1000.

It is possible for the gel electrolyte precursor of the present invention to contain another epoxy resin including, for example, phenol novolak resin, bisphenol A, bisphenol S, bisphenol F, a glycidyl ether type epoxy resin formed by the reaction between epichlorohydrin and an alcohol such as alkyl alcohol, dialykyl alcohol, and another polyfunctional alcohol, a modified material of said glycidyl ether type epoxy resin, an epoxy resin obtained by epoxidizing polybutadiene and the unsaturated bond present in the copolymer of butadiene, an epoxy resin obtained by epoxidizing triallyl isocyanurate, a reaction product between epichlorohydrin and a polyfunctional amine such as aniline or ethylene diamine, and the epoxy resins described on pages 69 to 108 of "Epoxy Resin" compiled by Kakiuchi and published in 1977 from Shokodo. It is possible for a reactive group such as a vinyl group, an acrylic group or a methacrylic group to be substituted in a part of these epoxy resins.

It is possible for the gel electrolyte precursor of the present invention to further contain a monofunctional epoxy resin. The monofunctional epoxy resins used in the present invention include, for example, cyclohexene oxide, butyl glycidyl ether, butyl glycidyl ether having polyethylene oxide introduced therein as a substituent, and cyclohexene oxide having polyethylene oxide introduced therein as a substituent. The gel electrolyte containing such a monofunctional epoxy resin permits increasing the flexibility of the gel electrolyte, making it possible to improve the bonding strength between the electrode and the gel electrolyte.

In the gel electrolyte precursor of the present invention, it is also possible to use a resin having an acrylic group (methacrylic group) as a gelling agent. It is possible to obtain a gel electrolyte having a high flexibility by gelling the gel electrolyte precursor containing both an epoxy resin and a resin having an acrylic group. As a result, it is possible to further improve the bonding strength between the electrode and the gel electrolyte. The resin having an acrylic group (methacrylic group) used in the present invention includes, for example, acrylic acid, methacrylic acid, an acryl modified resin having at least one functional group of an acrylic group and a methacrylic group and obtained by the reaction between a epoxy resin such as an aromatic epoxy resin or an aliphatic epoxy resin and a derivative of acrylic acid or methacrylic acid, and acryl modified resin having an alkyl backbone chain, a polyether backbone chain, a polyester backbone chain or a cyclohexane backbone chain. It is possible for an unreacted epoxy group to remain in the acryl modified resin.

It is desirable for the gelling agent to be contained in the gel electrolyte precursor in an amount falling within a range of between 1 and 30% by weight. If the gelling agent content is lower than 1% by weight, it is possibly difficult for the electrolyte to gel. On the other hand, if the gelling agent content exceeds 30% by weight, the viscosity of the gel precursor is increased, which possibly lowers the permeability into the electrode. It is more desirable for the gelling agent content to fall within a range of between 5 and 10% by weight.

It is desirable for the gelling agent content to fall within a range of between 1 and 80% by weight based on the amount of the electrolyte. If the content of the gelling agent is unduly high, the viscosity of the gel electrolyte precursor tends to be undesirably increased. On the other hand, if the content of the gelling agent is unduly small, it is difficult to permit the electrolyte to gel. It is more desirable for the gelling agent in an amount falling within a range of between 5 and 20% by weight based on the amount of the electrolyte.

It is possible for the gel electrolyte precursor of the present invention to contain a catalyst or a crosslinking agent for crosslinking the epoxy resin.

It is possible to use, for example, a ring opening polymerization catalyst as the catalyst. The ring opening polymerization catalyst used in the present invention includes, for example, a metal complex, silanol, a silicon compound capable of generating silanol, a phenolic compound, a compound capable of generating a phenolic compound, an onium compound, and the catalysts described on pages 193 to 198 of "Epoxy Resin" compiled by Kakiuchi and published in 1977 from Shokodo. The catalysts described on pages 193 to 198 of "Epoxy Resin" noted above include, for example, a strongly basic catalyst such as an imidazole series catalyst or a tertiary amine catalyst. It is possible to use a single kind of the compound or a plurality of kinds of the compounds pointed out above as the catalyst. Also, it is desirable to use silanol, a silicon compound capable of generating silanol, a phenolic compound, and a compound capable of generating a phenolic compound in combination with a metal complex.

The metal complex used in the present invention includes, for example, a metal complex in which an acetyl acetone complex, an ethyl acetate complex, a complex of a long chain ester obtained from ethyl acetate, a salicyl aldehyde complex or a derivative of these four kinds of complexes constitutes at least one of the ligands of the metal complex. The metal element contained in the metal complex includes, for example, aluminum, zirconium, iron, zinc, chromium, nickel and titanium. Particularly, the aluminum complex produces the best result. The aluminum complex also produces the effect of increasing the migration rate of the lithium ions.

The onium salt used in the present invention includes, for example, sulfonium salt. Particularly, it is desirable to use the sulfonium salt containing at least one of triphenyl sulfonium and triphenyl sulfonium salt. Since the sulfonium salt permits promoting the crosslinking reaction rate of the epoxy resin, it is possible to permit the gel electrolyte precursor to gel at room temperature. It is desirable for the triphenyl sulfonium salt to have a structure represented by chemical formula (15) given below:

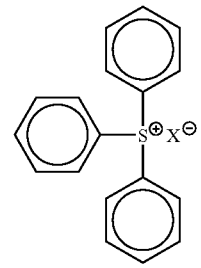

Formula (15)

where X represents a substituent selected from the group consisting of $PF_6^-$, $AsF_6^-$, $SbF_6^-$ and $BF_4^-$.

It is desirable for the catalyst content of the gel electrolyte precursor to fall within a range of between 0.01% by weight and 80% by weight based on the amount of the epoxy resin, more preferably between 0.1% by weight and 20% by weight.

The crosslinking agent used in the present invention includes, for example, a polyhydric phenol such as phenol novolak resin or cresol novolak resin, and the acid anhydrides described on pages 128 to 130 of "Epoxy Resin" compiled by Kakiuchi and published in 1977 by Shokodo. It is desirable for these crosslinking agents to be added in an amount substantially equal in the equivalent amount to the epoxy resin. If a phenol derivative such as a polyhydric phenol is added as a crosslinking agent, a polyether structure and hydroxyl groups are formed by the reaction between the epoxy resin and the phenol derivative so as to permit the electrolyte to gel. On the other hand, if an acid anhydride is added as a crosslinking agent, an ester bond is formed by the reaction between the acid anhydride and the epoxy resin so as to permit the electrolyte to gel.

In the case of using at least one kind of an epoxy resin selected from the group consisting of an alicyclic epoxy resin having a cyclohexene oxide structure (cyclohexene oxide group) and cyclohexene oxide, it is desirable to use at least one of $LiPF_6$ and $LiBF_6$ as the lithium salt contained in the electrolyte. In this case, it is possible to achieve crosslinking of the epoxy resin without adding any of the catalyst and the crosslinking agent so as to permit the electrolyte to gel. Also, since the gel electrolyte precursor containing said at least one kind of an epoxy resin as the epoxy resin has a low viscosity, it is possible to improve the permeability of the gel electrolyte precursor into the electrode and the separator. Incidentally, the crosslinking reaction is a homopolymerization reaction of the epoxy resin, a polyether having a cyclohexane ring in the backbone chain can be formed by the crosslinking reaction.

The electrolyte will now be described.

The electrolyte comprises a nonaqueous solvent and a lithium salt dissolved in the nonaqueous solvent.

The nonaqueous solvent used in the present invention includes, for example,γ-butyrolactone (BL), propylene carbonate (PC), ethylene carbonate (EC), vinylene carbonate (VC), trifluoropropylene carbonate (TFPC), diethyl carbonate (DEC), methyl ethyl carbonate (MEC), dimethoxy ethane, dioxane and tetrahydrofuran. One compound or a plurality of compounds selected from the compounds exemplified above can be used as the nonaqueous solvent.

It is desirable to use γ-butyrolactone (BL) as the nonaqueous solvent. It is desirable for the BL content of the nonaqueous solvent to be larger than 50% by volume and not larger than 95% by volume. The nonaqueous electrolyte secondary battery comprising a gel electrolyte containing a nonaqueous solvent containing γ-butyrolactone (BL) in an amount larger than 50% by volume and not larger than 95% by volume permits improving the conductivity of the gel electrolyte, permit suppressing the gas generation when the secondary battery is stored under a high temperature environment, and also permits suppressing the reducing decomposition of the nonaqueous solvent so as to improve the cycle life. It is more desirable for the BL content to be not smaller than 60% by volume and to be not larger than 95% by volume, and more desirably to be not smaller than 65% by volume and to be not larger than 90% by volume. It is desirable to use a cyclic carbonate, particularly, EC as a solvent mixed with BL. The nonaqueous electrolyte secondary battery comprising a gel electrolyte containing a nonaqueous solvent containing both BL and EC permits markedly improving the charge-discharge cycle characteristics and the large current discharge characteristics. Also, it is desirable to add a third solvent to a mixed solvent consisting of BL and EC. At least one compound selected from the group consisting of PC, VC, TFPC, diethyl carbonate (DEC), methyl ethyl carbonate (MEC) and an aromatic compound can be used as the third solvent noted above. The charge-discharge cycle characteristics of the nonaqueous electrolyte secondary battery can be further improved by adding the third solvent.

The lithium salt used in the present invention includes, for example, lithium perchlorate (LiClO$_4$), lithium hexafluoro phosphate (LiPF$_6$), lithium borofluoride (LiBF$_4$), lithium hexafluoro arsenate (LiAsF$_6$), lithium trifluoro meta-sulfonate (LiCF$_3$SO$_3$), and bistrifluoromethyl sulfonylimide lithium [(LiN(CF$_3$SO$_2$)$_2$]. Particularly, it is desirable to use at least one of LiPF$_6$ and LiBF$_4$ as the lithium salt.

It is desirable for the lithium salt to be dissolved in the nonaqueous solvent at a rate of 0.5 to 2 mol/liter.

A second gel electrolyte precursor of the present invention will now be described.

The second gel electrolyte precursor comprises three kinds of gel electrolyte precursors (A), (B) and (C) described below.

The gel electrolyte precursor (A) comprises an electrolyte, a halogen-containing compound dissolved in the electrolyte and containing at least one kind of the compound selected from the compounds represented by chemical formula (16) to chemical formula (22), and a compound dissolved in the electrolyte and containing at least one element A selected from the group consisting of N, P and S, the compound being capable of forming an onium salt together with the halogen-containing compound.

The gel electrolyte precursor (B) comprises an electrolyte, a halogen-containing compound dissolved in the electrolyte, and a compound dissolved in the electrolyte and containing at least one element A selected from the group consisting of N, P and S, the compound being capable of forming an onium salt together with the halogen-containing compound. At least one compound selected from the compounds represented by chemical formula (16) to chemical formula (22) is used as the compound containing element A.

Further, the gel electrolyte precursor (C) comprises an electrolyte, a halogen-containing compound dissolved in the electrolyte, and a compound dissolved in the electrolyte and containing at least one element A selected from the group consisting of N, P and S, the compound being capable of forming an onium salt together with the halogen-containing compound. At least one kind of compound selected from the compounds represented by chemical formula (16) to chemical formula (22) given below is used as the halogen-containing compound and the compound containing element A, respectively.

The electrolyte similar to those described previously in conjunction with the first gel electrolyte precursors can be used as the electrolyte contained in each of the gel electrolyte precursors (A) to (C).

Formula (16)

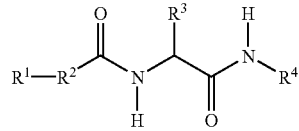

where R$^1$ represents a substituent having at least one atom A selected from the group consisting of N, P and S, an organic group having a halogen atom, or a halogen atom, R$^2$ represents a divalent organic group, R$^3$ represents a monovalent organic group, and R$^4$ represents a monovalent organic group.

The monovalent organic group represented by R$^3$ and R$^4$ includes, for example, an isopropyl group, an isobutyl group, a s-butyl group, a t-butyl group, a nonyl group, a decyl group, octadecyl group, nonadecyl group and an eicodecyl group. It is desirable for R$^4$ to be an octadecyl group. It is possible for R$^3$ and R$^4$ to be the same or to be different from each other.

The divalent organic group represented by R$^2$ includes, for example, oxide and methylene oxide. It is particularly desirable for R$^2$ to be methylene oxide.

Formula (17)

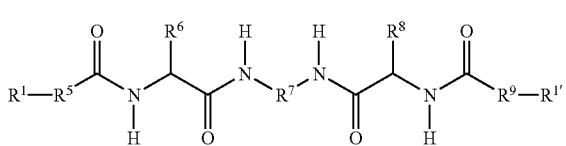

where $R^1$ represents a substituent group having at least one atom A selected from the group consisting of N, P and S, an organic group having a halogen atom, or a halogen atom, $R^{1'}$ represents a substituent group having at least one atom A selected from the group consisting of N, P and S, a halogen-containing organic group or a halogen atom, $R^5$ represents a divalent organic group, $R^6$ represents a monovalent organic group, $R^7$ represents a divalent organic group, $R^8$ represents a monovalent organic group, and $R^9$ represents a divalent organic group.

Where $R^1$ represents the substituent group noted above, $R^{1'}$ also represents the substituent group noted above. On the other hand, where $R^1$ represents the organic group noted above or a halogen atom, $R^{1'}$ also represents the organic group noted above or a halogen atom. It is possible for $R^1$ and $R^{1'}$ to be the same or to be different from each other.

The monovalent organic groups similar to those described previously in conjunction with chemical formula (16) can be used as the monovalent group represented by each of $R^6$ and $R^8$. It is possible for $R^6$ and $R^8$ to be the same or to be different from each other.

Further, the divalent organic groups similar to those described previously in conjunction with chemical formula (16) can also be used as the divalent organic group represented by each of $R^5$, $R^7$ and $R^9$. It is possible for $R^5$, $R^7$ and $R^9$ to be the same or to be different from each other.

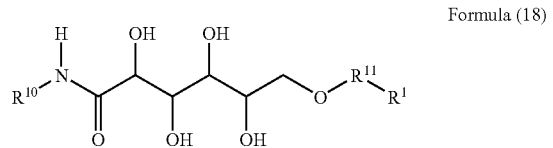

Formula (18)

where $R^1$ represents a substituent group having at least one atom A selected from the group consisting of N, P and S, a halogen-containing organic group or a halogen atom, $R^{10}$ represents a monovalent organic group, and $R^{11}$ represents a divalent organic group.

The monovalent organic group and the divalent organic group similar to those described previously in conjunction with chemical formula (16) can be used as the monovalent organic group represented by $R^{10}$ and as the divalent organic group represented by $R^{11}$, respectively.

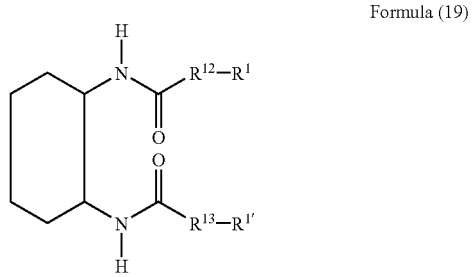

Formula (19)

where $R^1$ represents a substituent group having at least one atom A selected from the group consisting of N, P and S, an organic group having a halogen atom, or a halogen atom, $R^{1'}$ represents a substituent group having at least one atom A selected from the group consisting of N, P and S, a halogen-containing organic group or a halogen atom, $R^{12}$ represents a divalent organic group, and $R^{13}$ represents a divalent organic group.

Where $R^1$ represents the substituent group noted above, $R^{1'}$ also represents the substituent group noted above. On the other hand, where $R^1$ represents the organic group noted above or a halogen atom, $R^{1'}$ also represents the organic group noted above or a halogen atom. It is possible for $R^1$ and $R^{1'}$ to be the same or to be different from each other.

The divalent organic group described previously in conjunction with formula (16) can be used as each of $R^{12}$ and $R^{13}$. It is possible for $R^{12}$ and $R^{13}$ to be the same or to be different from each other.

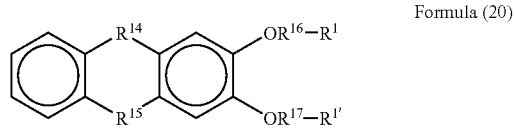

Formula (20)

where $R^1$ represents a substituent group having at least one atom A selected from the group consisting of N, P and S, an organic group having a halogen atom, or a halogen atom, $R^{1'}$ represents a substituent group having at least one atom A selected from the group consisting of N, P and S, a halogen-containing organic group or a halogen atom, $R^{14}$ represents —(C=O)— or —CH—, $R^{15}$ represents —(C=O)— or —CH—, and $R^{16}$ represents a divalent organic group, and $R^{17}$ represents a divalent organic group.

Where $R^1$ represents the substituent group noted above, $R^{1'}$ also represents the substituent group noted above. On the other hand, where $R^1$ represents the organic group noted above or a halogen atom, $R^{1'}$ also represents the organic group noted above or a halogen atom. It is possible for $R^1$ and $R^{1'}$ to be the same or to be different from each other.

It is possible for $R^{14}$ and $R^{15}$ to be the same or to be different from each other.

The divalent organic group similar to that described previously in conjunction with chemical formula (16) can be used as the divalent organic group represented by $R^{16}$ and $R^{17}$. It is possible for $R^{16}$ and $R^{17}$ to be the same or to be different from each other.

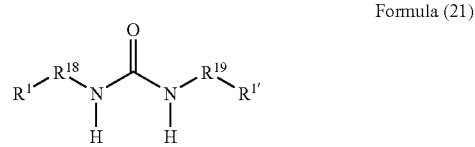

Formula (21)

where $R^1$ represents a substituent group having at least one atom A selected from the group consisting of N, P and S, an organic group having a halogen atom, or a halogen atom, $R^{1'}$ represents a substituent group having at least one atom A selected from the group consisting of N, P and S, a halogen-containing organic group or a halogen atom, $R^{18}$ represents a divalent organic group, and $R^{19}$ represents a divalent organic group.

Where $R^1$ represents the substituent group noted above, $R^{1'}$ also represents the substituent group noted above. On the other hand, where $R^1$ represents the organic group noted above or a halogen atom, $R^{1'}$ also represents the organic group noted above or a halogen atom. It is possible for $R^1$ and $R^{1'}$ to be the same or to be different from each other.

The divalent organic group similar to that described previously in conjunction with chemical formula (16) can be used as the divalent organic group represented by $R^{18}$ and $R^{19}$. It is possible for $R^{18}$ and $R^{19}$ to be the same or to be different from each other.

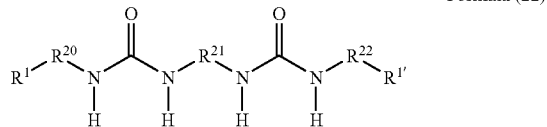

Formula (22)

where $R^1$ represents a substituent group having at least one atom A selected from the group consisting of N, P and S, an organic group having a halogen atom, or a halogen atom, $R^{1\prime}$ represents a substituent group having at least one atom A selected from the group consisting of N, P and S, a halogen-containing organic group or a halogen atom, $R^{20}$ represents a divalent organic group, $R^{21}$ represents a monovalent organic group, and $R^{22}$ represents a divalent organic group.

Where $R^1$ represents the substituent group noted above, $R^{1\prime}$ also represents the substituent group noted above. On the other hand, where $R^1$ represents the organic group noted above or a halogen atom, $R^{1\prime}$ also represents the organic group noted above or a halogen atom. It is possible for $R^1$ and $R^{1\prime}$ to be the same or to be different from each other.

The monovalent organic group similar to that described previously in conjunction with chemical formula (16) can be used as the monovalent organic group represented by $R^{21}$.

The divalent organic groups similar to those described previously in conjunction with chemical formula (16) can be used as the divalent organic groups represented by $R^{20}$ and $R^{22}$. It is possible for $R^{20}$ and $R^{22}$ to be the same or to be different from each other.

The compound contained in the gel electrolyte precursor (A), said compound having at least one element A selected from the group consisting of N, P and S, will now be described.

The compound having a nitrogen atom includes, for example, a monomer having an atomic group derived from a nitrogen-containing heterocyclic compound, an oligomer having an atomic group including a nitrogen-containing heterocyclic structure, a polymer having an atomic group including a nitrogen-containing heterocyclic structure, a monomer having a tertiary nitrogen, an oligomer having a tertiary nitrogen, and a polymer having a tertiary nitrogen. The nitrogen-containing heterocyclic compound noted above includes, for example, pyridine, imidazole, 1-methylimidazole, 1-ethylimidazole, 1-propylimidazole, pyrrole, oxazole, thiazole, furazane, pyridazine, pyrimidine, pyrazine, indole, quinoline, purine, acridine, and carbazole. On the other hand, the tertiary nitrogen includes, for example, primary amino group, secondary amino group, and tertiary amino group. To be more specific, the tertiary nitrogen includes, for example, an amino group, an N-methyl amino group, an N,N-dimethyl amino group, N,N-diethyl amino group, N,N-ethylpropyl aminot group, and an N,N-dibutyl amino group.

In the compound having a nitrogen atom, it is possible for any of the backbone chain and the side chain to have the nitrogen-containing heterocyclic structure and the tertiary nitrogen. Where the side chain has the nitrogen-containing heterocyclic structure or the tertiary nitrogen, it is possible for the backbone chain to be formed of polystyrene, polyester, polycarbonate, polymethacrylic acid ester, polyvinyl ether, polyacrylic acid ester or polyamide. In place of the nitrogen-containing polymer having such a backbone chain, it is possible to use the monomer thereof as a compound having a nitrogen atom. The gel electrolyte precursor containing a monomer having a nitrogen atom permits suppressing the viscosity of the precursor to a low level. It should be noted that, after the electrode group is impregnated with the gel electrolyte precursor, the vinyl polymerization and the reaction to form an onium salt cause the crosslinking reaction of the gelling agent to proceed. For example, dimethyl aminoethyl methacrylic acid ester, dibromohexane and benzoyl peroxide used as a radical polymerization agent are added to an electrolyte to obtain a gel electrolyte precursor. Then, the electrode group is impregnated with the gel electrolyte precursor. If the electrode group impregnated with the gel electrolyte precursor is heated, it is possible to permit the vinyl polymerization and the reaction for forming an onium salt to proceed simultaneously.

The compound having a sulfur atom includes, for example, a polymer having an alkylthio ether unit in the backbone chain or the side chain, and a polymer having an aromatic thio ether unit in the backbone chain or side chain. Where the alkylthio ether unit and the aromatic thio ether unit are present on the side chain of the compound having a sulfur atom, it is possible for the backbone chain to be formed of, for example, polystyrene, polyester, polycarbonate, polymethacrylic acid ester, polyvinyl ether, polyacrylic acid ester or polyamide.

The compound having a phosphorus atom includes, for example, a polymer having an alkyl phosphine unit in the backbone chain or the side chain, and a polymer having an aromatic phosphine unit in the backbone chain or the side chain. Where the alkyl phosphine unit and the aromatic phosphine unit are present in the side chain of the compound having a phosphorus atom, it is possible for the backbone chain to be formed of, for example, polystyrene, polyester, polycarbonate, polymethacrylic acid ester, polyvinyl ether, polyacrylic acid ester or polyamide.

It is desirable for the molecular weight of the polymer having the element A to be not higher than 50,000 in order to suppress the viscosity of the gel electrolyte precursor at a low level. Also, in order to lower the viscosity of the gel electrolyte precursor, it is possible to use as the compound having the element A a monomer having the element A, said monomer having an atomic group capable of an ionic polymerization or a radical polymerization such as a vinyl group, an acrylic group, a methacrylic group or an epoxy group. In this case, the reaction to form an onium compound takes place simultaneously with the polymerization reaction of the monomer having the element A in the gelling process. As a result, it is possible for the electrolyte to gel even in the presence of a low concentration of a gelling agent at which the electrolyte is not allowed to gel by only the polymerization of the atomic groups capable of an ionic polymerization or a radical polymerization. It follows that it is possible to lower the initial viscosity of the gel electrolyte precursor. The monomers having the element A and having an atomic group capable of an ionic polymerization or a radical polymerization include, for example, vinyl pyridine, dimethylamino ethyl methyl methacrylate, and diethylamino ethyl acrylate.

The halogen-containing compound contained in the gel electrolyte precursor (B) will now be described.

The halogen-containing compound used in the present invention includes, for example, dibromomethane, dibromoethane, dibromobutane, dibromopentane, dibromohexane, dibromoheptane, dibromooctane, dibromodecane, 1,2,4,5-tetrakis bromomethyl benzene, polybromo vinyl, polybromo styrene, tetrabromo ethylene, dichloromethane, dichloroethane, dichlorobutane, dichloropentane, dichlorohexane, dichloroheptane, dichlorooctane, dichlorodecane, 1,2,4,5-tetrakis chloromethyl benzene, polychloro vinyl, polychloro styrene, tetrachloro ethylene, diiodomethane, diiodoethane, diiodobutane, diiodopentane, diiodohexane, diiodoheptane, diiodooctane, diiododecane, 1,2,4,5-tetrakis iodomethyl benzene, polyiodovinyl, polyiodostyrene and tetraiodoethylene.

The compound having the element A, which is represented by chemical formula (16) to chemical formula (22) described previously and contained in each of the gel electrolyte precursor (B) and the gel electrolyte precursor (C), will now be described.

The substituent group having the element A selected from the group consisting of N, P and S includes, for example, an atomic group having a nitrogen-containing heterocyclic structure, a primary amino group, a secondary amino group, a tertiary amino group, an atomic group derived from an alkyl thio ether, an atomic group derived from an aromatic thio ether, an atomic group derived from an alkyl phosphine, and an atomic group derived from an aromatic phosphine. The atomic group derived from a nitrogen-containing heterocyclic compound, primary amino group, secondary amino group and tertiary amino group described previously can be used as the substituent having the element A.

The halogen-containing compound represented by chemical formula (16) to chemical formula (22) described previously and contained in each of the gel electrolyte precursor (A) and the gel electrolyte precursor (C) will now be described. It is possible to use the atomic group derived from the halogen-containing compound described previously as the organic group having a halogen atom and contained in the halogen-containing compound represented by chemical formula (16) to chemical formula (22) described previously. It is desirable for the halogen atom contained in the halogen-containing compound represented by chemical formula (16) to chemical formula (22) to be a bromine atom, a chlorine atom or an iodine atom.

Each of the gel electrolyte precursors (A) to (C) contain the element A selected from the group consisting of N, P and S and a halogen-containing compound. It is desirable for the compound having the element A to be contained in an amount falling within a range of between 1 equivalent % and 10,000 equivalent %, preferably between 20 equivalent % and 500 equivalent %, based on the amount of the halogen-containing compound. It is desirable for the mixing amount of the compound having the element A to fall within a range of between 1% by weight and 80% by weight based on the amount of the liquid electrolyte. If the mixing amount of the compound having the element A is unduly large, the viscosity of the gel electrolyte precursor tends to be increased so as to lower the permeability of the gel electrolyte precursor into the electrode and the separator. Also, it is possible for the ionic conductivity of the resultant gel electrolyte to be lowered. On the other hand, if the mixing amount of the compound having the element A is unduly small, the viscosity of the resultant gel electrolyte is lowered. In this case, it is possibly difficult to retain the liquid electrolyte in the gel electrolyte. Under the circumstances, it is more desirable for the mixing amount of the compound having the element A to fall within a range of between 5% by weight and 20% by weight based on the amount of to the liquid electrolyte.

A nonaqueous electrolyte secondary battery will now be described as an example of the chemical battery of the present invention.

The nonaqueous electrolyte secondary battery of the present invention comprises a positive electrode, a negative electrode and a gel electrolyte. To be more specific, it is possible for the nonaqueous electrolyte secondary battery to have any of the three types described below.

The first nonaqueous electrolyte secondary battery comprises a positive electrode, a negative electrode, a separator interposed between the positive electrode and the negative electrode, a gel electrolyte held inside the positive electrode, the negative electrode and the separator and dispersed in the interface between the positive electrode and the separator and in the interface between the negative electrode and the separator, and a vessel housing an electrode group including the positive electrode, the negative electrode and the gel electrolyte.

The second nonaqueous electrolyte secondary battery comprises a positive electrode, a negative electrode, a separator, a gel electrolyte layer interposed between the positive electrode and the separator and interposed between the negative electrode and the separator, and a vessel housing an electrode group including the positive electrode, the negative electrode and the gel electrolyte layer.

Further, the third nonaqueous electrolyte secondary battery comprises a positive electrode, a negative electrode, a gel electrolyte layer interposed between the positive electrode and the negative electrode, and a vessel housing an electrode group including the positive electrode, the negative electrode and the gel electrolyte layer.

Each of the first and second nonaqueous electrolyte secondary batteries comprises a separator and, thus, exhibits a mechanical strength higher than that of the third nonaqueous electrolyte secondary battery.

The positive electrode, the negative electrode, the separator, the gel electrolyte, and the housing vessel will now be described.

1) Positive Electrode:

The positive electrode comprises a current collector and an active substance-containing layer formed on one surface or both surfaces of the current collector.

The active substance-containing layer contains a positive electrode active substance, a conducting agent and a binder.

The positive electrode active substance used in the present invention includes, for example, various oxides such as manganese dioxide, lithium manganese complex oxide, lithium-containing nickel oxide, lithium-containing cobalt oxide, lithium-containing nickel cobalt oxide, lithium-containing iron oxide, and lithium-containing vanadium oxide, and chalcogen compounds such as titanium disulfide and molybdenum disulfide. Particularly, it is desirable to use lithium-containing cobalt oxide, e.g., $LiCoO_2$, lithium-containing nickel cobalt oxide, e.g., $LiNi_{0.8}Co_{0.2}O_2$, and lithium manganese complex oxides, e.g., $LiMn_2O_4$ and $LiMnO_2$, because it is possible to obtain a high voltage.

The conducting agent used in the present invention includes, for example, acetylene black, carbon black and graphite.

The binder can perform the function of permitting the active substance to be held by the current collector and the function of bonding the active substance particles to each other. The binder used in the present invention includes, for example, polytetrafluoro ethylene (PTFE), polyvinylidene fluoride (PVdF), ethylene-propylene-diene copolymer (EPDM), and styrene-butadiene rubber (SBR).

Concerning the mixing ratio of the positive electrode active substance, the conducting agent and the binder, it is desirable for the positive electrode active substance to fall within a range of between 80 and 95% by weight, for the conducting agent to fall within a range of between 3 and 20% by weight, and for the binder to fall within a range of between 2 and 7% by weight.

It is possible for the current collector to be formed of a porous conductive substrate or a non-porous conductive substrate. These conductive substrates can be formed of, for example, aluminum, stainless steel or nickel.

2) Negative Electrode:

The negative electrode comprises a current collector and a negative electrode layer formed on one surface of both surfaces of the current collector.

The negative electrode layer contains a carbonaceous material capable of absorbing-desorbing lithium ions and a binder.

A graphitized material or a carbonized material can be used as the carbonaceous material. The graphitized material and the carbonized material can be formed of, for example, graphite, coke, carbon fiber, and spherical carbon. It is possible to use the graphitized material and the carbonized material prepared by applying a heat treatment at 500 to 3,000° C. to, for example, a thermosetting resin, isotropic pitch, mesophase pitch, mesophase pitch based carbon fiber or mesophase microspheres. Particularly, it is desirable to use the graphitized material prepared by setting the temperature for the heat treatment at a level not lower than 2,000° C. and having a graphite crystal having an interplanar spacing $d_{002}$ derived from (002) reflection of 0.34 nm or less. The nonaqueous electrolyte secondary battery comprising the negative electrode containing the particular graphitized material as the carbonaceous material permits exhibiting markedly improved battery capacity and large current discharge characteristics. It is more desirable for the interplanar spacing $d_{002}$ to be not larger than 0.336 nm.

The binder used in the present invention includes, for example, polytetrafluoroethylene (PTFE), polyvinylidene fluoride (PVdF), ethylene-propylenediene copolymer (EPDM), styrene-butadiene rubber (SBR), and carboxymethyl cellulose (CMC).

Concerning the mixing ratio of the carbonaceous material and the binder, it is desirable for the mixing amount of the carbonaceous material to fall within a range of between 90 and 98% by weight and for the mixing ratio of the binder to fall within a range of between 2 and 20% by weight.

It is possible for the current collector to be formed of a porous conductive substrate or a non-porous conductive substrate. These conductive substrates can be formed of, for example, copper, stainless steel or nickel.

The negative electrode layer contains a carbonaceous material capable of absorbing-desorbing lithium ions. Alternatively, it is possible for the negative electrode layer to contain a metal such as aluminum, magnesium, tin or silicon, a metal compound such as a metal oxide, a metal sulfide, or a metal nitride, and a lithium alloy.

The metal oxide noted above includes, for example, tin oxide, silicon oxide, lithium titanium oxide, niobium oxide, and tungsten oxide.

The metal sulfide noted above includes, for example, tin sulfide and titanium sulfide.

The metal nitride noted above includes, for example, lithium cobalt nitride, lithium iron nitride, and lithium manganese nitride.

Further, the lithium alloy noted above includes, for example, a lithium-aluminum alloy, a lithium-tin alloy, a lithium-lead alloy and a lithium-silicon alloy.

3) Separator (Spacer):

The separator is formed of a porous sheet. The porous sheet used as the separator includes, for example, a porous film or an unwoven fabric. It is desirable for the porous sheet to be formed of at least one kind of a material selected from the group consisting of polyolefin and cellulose. The polyolefin noted above includes, for example, polyethylene and polypropylene. Particularly, it is desirable to use a porous film made of polyethylene and/or polypropylene because the particular porous film permits improving the safety of the secondary battery.

It is desirable for the thickness of the separator to be not larger than 600 μm. If the thickness of the separator exceeds 600 μm, the internal resistance of the secondary battery tends to be increased. In order to decrease the thickness of the secondary battery, it is more desirable for the thickness of the separator to be not larger than 30 μm. The internal resistance of the secondary battery can be decreased with decrease in the thickness of the separator. However, if the thickness of the separator is unduly small, the mechanical strength of the separator is lowered, with the result that an internal short-circuiting tends to take place. In the present invention, a gel electrolyte is present in at least a part of the interface between the positive electrode and the separator and in at least a part of the interface between the negative electrode and the separator. As a result, the mechanical strength of the separator can be increased by the presence of the gel electrolyte. It follows that it is possible to use a thin separator having a thickness of 3 to 30 μm without giving rise to an internal short-circuiting. Preferably, the lower limit in the thickness of the separator should be 10 μm.

It is desirable for the air permeability of the separator to be not higher than 600 seconds/100 $cm^3$. The term "air permeability" noted above denotes the time (seconds) required for 100 $cm^3$ of the air to pass through the porous separator. If the air permeability exceeds 600 seconds/100 $cm^3$, it is possibly difficult to obtain a high lithium ion mobility in the separator. It is more desirable to set the lower limit of the air permeability at 50 seconds/100 $cm^3$. If the air permeability is lower than 50 seconds/100 $cm^3$, it is possibly difficult to obtain a sufficient mechanical strength of the separator, though the separator is reinforced by the gel electrolyte. It is more desirable to set the upper limit of the air permeability at 500 seconds/100 $cm^3$ and, further more desirably at 400 seconds/100 $cm^3$. On the other hand, it is more desirable to set the lower limit of the air permeability at 100 seconds/100 $cm^3$.

It is desirable for the porosity of the separator to fall within a range of between 30% and 80%. If the porosity is lower than 30%, it is possibly difficult to obtain a high electrolyte retaining capability in the separator. On the other hand, if the porosity exceeds 80%, it is possibly difficult to obtain a sufficiently high mechanical strength of the separator, though the separator is reinforced by the gel electrolyte. It is more desirable for the porosity of the separator to fall within a range of between 30% and 60%, further more desirably between 35% and 50%.

4) Gel Electrolyte:

It is possible to use two kinds of gel electrolytes described below as the electrolyte used in the present invention.

The first gel electrolyte comprises a crosslinked body and an electrolyte, said crosslinked body being obtained by crosslinking at least one kind of the compound selected from the group consisting of an epoxy compound having an alicyclic structure and at least one epoxy group in a single molecule and an alicyclic epoxy resin. The first gel electrolyte can be obtained by allowing the first gel electrolyte precursor described previously to gel.

The crosslinked body is capable of performing the function of an electrolyte retaining polymer component. The crosslinked body can contain a crosslinked epoxy resin, the epoxy resin having, for example, an ethylene oxide unit, an alkyl group being substituted for at least one hydrogen atom of each methylene group of the ethylene oxide unit. Also, the crosslinked body having said at least one ethylene oxide unit can be obtained by crosslinking an alicyclic epoxy resin.

It is desirable for the crosslinked body to have a repeating unit represented by chemical formula (23) given below:

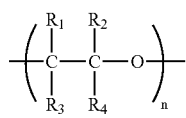

Formula (23)

where $R_1$ represents an alkyl group or an aralkyl group, $R_2$ represents an alkyl group or an aralkyl group, $R_3$ represents an alkyl group or a hydrogen atom, $R_4$ represents an alkyl group or a hydrogen atom, and n is a natural number. Examples of the aralkyl group includes $C_6H_5$—$CH_2$—$CH$—.

The crosslinked body having the repeating unit represented by chemical formula (23) can be obtained by crosslinking an alicyclic epoxy resin.

On the other hand, the second gel electrolyte comprises a polymer of an onium salt formed by the reaction between a halogen-containing compound and a compound having at least one kind of element A selected from the group consisting of N, P and S, and an electrolyte. In the second gel electrolyte, at least one kind of the compound selected from the compounds represented by chemical formula (16) to chemical formula (22) is used as the halogen-containing compound, or at least one kind of the compound selected from the compounds represented by chemical formula (16) to chemical formula (22) is used as the compound containing element A described previously. Alternatively, one kind of the compound selected from the compounds represented by chemical formula (16) to chemical formula (22) is used as the halogen-containing compound and, at the same time, at least one kind of the compound selected from the compounds represented by chemical formula (16) to chemical formula (22) is used as the compound containing element A described previously.

The second gel electrolyte can be obtained by allowing the second gel electrolyte precursor described previously to gel. Further, it is possible for the polymer of the onium salt described previously to perform the function of the electrolyte retaining polymer component.

5) Housing Vessel:

The electrode group including the positive electrode and the negative electrode and the gel electrolyte are housed in the housing vessel. It is possible for the housing vessel to be shaped like, for example, a cylinder having a bottom and circular in cross section, a cylinder having a bottom and rectangular in cross section, or a bag. Also, the housing vessel can be formed of, for example, a film material or a metal plate.

The film material forming the housing vessel can be formed of, for example, a metal film, a resin sheet made of, for example, a thermoplastic resin, or a sheet comprising a flexible metal layer and a resin layer made of a thermoplastic resin and formed on one surface or both surfaces of the metal layer. The resin sheet and the resin layer noted above can be formed of a single kind of resin or a plurality of kinds of resins, respectively. On the other hand, the metal layer noted above can be formed of a single kind of metal or a plurality of kinds of metals. Further, the metal film noted above can be formed of, for example, aluminum, iron, nickel, stainless steel or nickel.

It is desirable for the thickness of the housing vessel, i.e., the thickness of the wall of the housing vessel, to be not larger than 0.5 mm. Where the thickness of the wall of the housing vessel formed of a film material including a resin layer is set at 0.5 mm or less, it is possible to make the secondary battery light in weight and to increase the energy density per unit weight of the battery. It is more desirable for the thickness of the wall of the housing vessel to be not larger than 0.25 mm. Particularly, it is desirable for the thickness in question to fall within a range of between 0.05 mm and 0.2 mm. In this case, it is possible to make the secondary battery thin and light in weight.

Particularly, it is desirable to use the sheet comprising a flexible metal layer and a resin layer formed on one surface or both surfaces of the metal layer because the particular sheet is light in weight, exhibits a high mechanical strength, and is capable of preventing a substance such as water from entering the secondary battery from the outside. The sealing of the housing vessel formed of the sheet noted above is achieved by, for example, a heat seal. Therefore, it is desirable to arrange a thermoplastic resin layer on the inner surface of the housing vessel. The thermoplastic resin used in the present invention includes, for example, polyolefins such as polyethylene and polypropylene. On the other hand, it is desirable for the metal layer noted above to be formed of aluminum because the aluminum layer is capable of preventing the water intrusion into the secondary battery.

Methods of the present invention for manufacturing the first to third nonaqueous electrolyte secondary batteries will now be described.

The first nonaqueous electrolyte secondary battery of the present invention is manufactured by the method described below. In the first step, an electrode group is prepared by spirally winding a laminate structure comprising a positive electrode, a separator and a negative electrode laminated in the order mentioned or by winding the particular laminate structure in a flattened shape. The electrode group thus prepared is housed in the housing vessel, followed by pouring the gel electrolyte precursor into the housing vessel and subsequently sealing the vessel and, as required, a gelling treatment to the gel electrolyte precursor so as to obtain a secondary battery. As the gelling treatment, it is possible to employ, for example, a heat treatment or an electron beam irradiation. Incidentally, it is possible to omit the gelling treatment in the case where it is possible for the gel electrolyte precursor to gel at room temperature.

In this manufacturing method, it is possible to pour the gel electrolyte precursor after pouring of a solution of a polymer having an adhesivity into the housing vessel. In this method, it is possible to permit the polymer having an adhesivity to be held inside the positive electrode, the negative electrode and the separator and to be dispersed in the interface between the positive electrode and the separator and in the interface between the negative electrode and the separator, with the result that it is possible to increase the adhesion force among the positive electrode, the separator and the negative electrode.

The polymer having an adhesivity noted above includes, for example, polyacrylonitrile (PAN), polyacrylate (PMMA), polyvinylidene fluoride (PVdF), polyvinyl chloride (PVC), and polyethylene oxide (PEO). Particularly, it is desirable to use polyvinylidene fluoride. A solution of a polymer having an adhesivity can be prepared by dissolving a polymer having an adhesivity in an organic solvent such as dimethyl formamide.

The method of manufacturing a second nonaqueous electrolyte secondary battery will now be described.

In the first step, an electrode group is prepared by coating the surface of the positive electrode and the surface of the negative electrode with the gel electrolyte precursor, followed by interposing a separator between the positive electrode and the negative electrode. Alternatively, the electrode group can be prepared by coating the both surfaces of the separator with the gel electrolyte precursor, followed by interposing the separator between the positive electrode and the negative electrode. Then, the electrode group prepared by any of the methods described above is housed in the housing vessel, followed by sealing the housing vessel. Then, a gelling treatment is applied, as desired, so as to obtain a desired secondary battery. Incidentally, it is possible to apply a pressing treatment after the sealing process and before the gelling treatment.

The method of manufacturing the third nonaqueous electrolyte secondary battery will now be described.

In the first step, the electrode group is prepared by coating surface of the positive electrode and the surface of the negative electrode with the gel electrolyte precursor, followed by laminating the positive electrode and the negative electrode one upon the other. The electrode group thus prepared is housed in a housing vessel and, then, the housing vessel is sealed. Further, a gelling treatment is applied, as required, so as to obtain a desired secondary battery. Incidentally, it is possible to apply a pressing treatment after the sealing process and before the gelling treatment.

Also, it is certainly possible to prepare the electrode group by forming the gel electrolyte precursor into a film so as to form a gel electrolyte layer, followed by interposing the gel electrolyte layer between the positive electrode and the negative electrode. The electrode group thus prepared is housed in the vessel so as to obtain the third nonaqueous electrolyte secondary battery. In this case, however, it is possible for the adhesion force between the positive electrode and the gel electrolyte layer and the adhesion force between the negative electrode and the gel electrolyte layer to be lowered.

An example of the nonaqueous electrolyte secondary battery of the present invention will now be described with reference to FIGS. 1 to 3.

Specifically, FIG. 1 is a partial cross sectional view showing a cylindrical nonaqueous electrolyte secondary battery as an example of the nonaqueous electrolyte secondary battery of the present invention. FIG. 2 is a cross sectional view showing a thin type nonaqueous electrolyte secondary battery as an example of the nonaqueous electrolyte secondary battery of the present invention. Further, FIG. 3 is a cross sectional view showing in a magnified fashion portion A shown in FIG. 2.

An electrode group 2 is housed in a cylindrical vessel 1 having a bottom, made of, for example, a soft steel and also acting as a negative electrode terminal. The electrode group 2 is prepared by spirally winding a laminate structure comprising a positive electrode 3, a separator (spacer) 4 and a negative electrode 5 that are laminated in the order mentioned. The separator 4 has fine pores in which a gel electrolyte is retained. The positive electrode 3 is formed of a porous body comprising a positive electrode current collector formed of, for example, a metal thin film and a positive electrode composite layer containing a positive electrode active material, a conducting agent and a binder. On the other hand, the negative electrode 5 is formed of a porous body comprising a negative electrode current collector formed of, for example, a metal thin film and a negative electrode composite layer containing a negative electrode active material, a conducting agent and a binder. The negative electrode 5 is connected to the vessel 1 via a negative electrode lead wire 6. An insulating plate 7 having an opening portion is arranged on an upper portion of the electrode group 2 within the vessel 1. A sealing body 11 formed of, for example, a soft steel and provided with a circular hole 8 in the center, a circular pressure releasing hole 9 positioned adjacent to the hole 8, and a liquid pouring hole is hermetically mounted by a laser welding to the upper opening of the vessel 1. A positive electrode terminal 12 formed of, for example, a high chromium steel is inserted into the circular hole 8 of the sealing body 11 such that the upper and lower end portions of the positive electrode terminal 12 are positioned to protrude from the sealing body 11 and is hermetically sealed by an insulating material 13 made of glass and loaded in the circular hole 8. Also, the liquid pouring hole is hermetically sealed by an insulating material 10 made of glass. On the other hand, one end of a positive electrode lead wire 14 is connected to the positive electrode 12, with the other end being connected to the positive electrode 3. Also, the pressure release hole 9 of the sealing body 11 is covered with a valve film 15.

Figure 2:
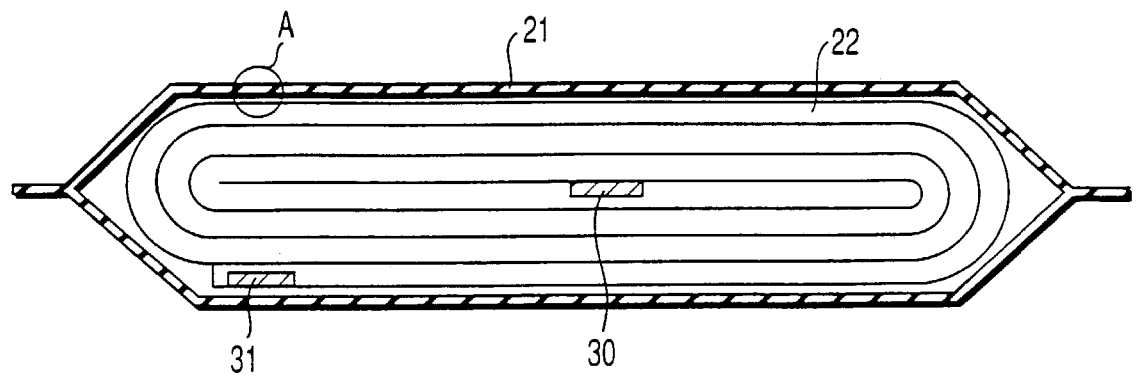
FIG. 2 is a cross sectional view showing a thin type nonaqueous electrolyte secondary battery as another example of the chemical battery of the present invention.
Figure 3:
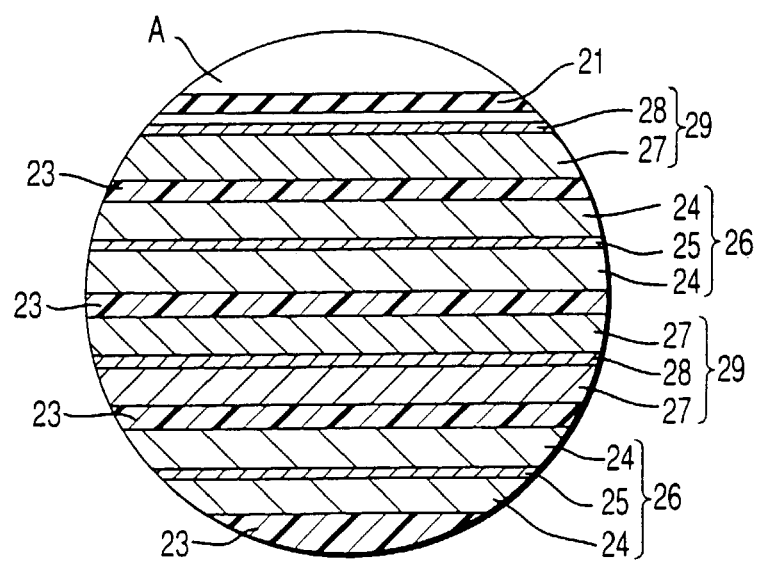
FIG. 3 is a cross sectional view showing in a magnified fashion portion A shown in FIG. 2.

As shown in FIG. 2, an electrode group 22 is housed in a housing vessel 21 formed of, for example, a sheet including a resin layer. The electrode group 22 is prepared by winding in a flattened shape a laminate structure consisting of a positive electrode, a separator (spacer) and a negative electrode. As shown in FIG. 3, the laminate structure noted above comprises a separator 23, a positive electrode 26 including an active material-containing layer 24, a positive electrode current collector 25 and an active material-containing layer 24, another separator 23, a negative electrode 29 including a negative electrode layer 27, a negative electrode current collector 28 and another negative electrode layer 27, another separator 23, another positive electrode 26 including another active material-containing layer 24, another positive electrode current collector 25 and another active material-containing layer 24, another separator 23, another negative electrode 29 including another negative electrode layer 27, and another negative electrode current collector 28, which are laminated one upon the other in the order mentioned. The negative electrode current collector 29 is positioned in the outermost circumferential surface of the electrode group 22. One end of a band-like positive electrode lead wire 30 is connected to the positive electrode current collector 25 of the electrode group 22, with the other end portion extending outward from the housing vessel 21. On the other hand, one end of a band-like negative electrode lead wire 31 is connected to the negative electrode current collector 28 of the electrode group 22, with the other end portion extending outward from the housing vessel 21.

In the first chemical cell battery of the present invention described above, used is a gel electrolyte precursor comprising a gelling agent and an electrolyte, said gelling agent containing at least one kind of an epoxy compound selected from the group consisting of an epoxy compound having an alicyclic structure and at least one epoxy group in a single molecule and an alicyclic epoxy resin. A gel electrolyte containing an electrolyte and crosslinked body obtained by crosslinking said at least one kind of an epoxy resin can be obtained by allowing the gel electrolyte precursor to gel.

As a result of an extensive research, the present inventors have found a gel electrolyte precursor that can be allowed to gel even if the amount of the gelling agent functioning as an electrolyte retaining polymer component in a gel electrolyte is diminished. What should be noted is that, in the present invention, it is possible to lower the gelling agent content in the gel electrolyte precursor, making it possible to lower the viscosity of the gel electrolyte precursor. The gel electrolyte precursor having a low viscosity is capable of permeating promptly a porous electrode. As a result, the gel electrolyte precursor can be allowed to gel by, for example, a heat treatment under the state that the electrode and the gel electrolyte precursor are strongly adhered to each other, with the result that it is possible to improve the contact state between the electrode and the gel electrolyte. Incidentally, the gel electrolyte precursor looses a macro fluidity by the gelling. Also, since it is possible to decrease the amount of the gelling agent contained in the gel electrolyte precursor, it is possible to increase the ionic conductivity of the gel electrolyte.

In a gel electrolyte, it is desirable for the phase of the electrolyte retaining polymer to be separated from the phase of the electrolyte. Since the gelling of the gel electrolyte precursor proceeds with the phases of the electrolyte and the electrolyte retaining polymer separated from each other, the local concentration of the reactive group is rendered very high so as to make it possible to permit the electrolyte to gel with a smaller amount of the gelling agent. Particularly, it is possible to increase the degree of the phase separation between the electrolyte retaining polymer and the electrolyte by using as the gelling agent at least one of the compound selected from the group consisting of an epoxy compound having an alicyclic structure and an alicyclic epoxy resin. If the phase of the electrolyte is separated from the phase of the electrolyte retaining polymer, the ion mobility within the gel electrolyte can be increased to a level substantially equal to the ion mobility within the liquid electrolyte, making it possible to prevent the ion mobility from being markedly lowered under a low temperature environment. Particularly, an epoxy compound having a cyclohexane ring as an alicyclic structure and an alicyclic epoxy resin having a structural formula including a cyclohexene oxide structure produce a prominent effect of promoting the phase separation between the electrolyte and the electrolyte retaining polymer in a gel electrolyte. It follows that, in the present invention, it is possible to improve the adhesion force between the electrode and the gel electrolyte and ionic conductivity of the gel electrolyte. In addition, it is possible to achieve the phase separation between the electrolyte and the polymer component within the gel electrolyte. As a result, it is possible to provide a chemical battery exhibiting an improved discharge capacity and improved charge-discharge cycle characteristics.

In the gel electrolyte precursor used in the first chemical battery of the present invention, at least one compound selected from the group consisting of an epoxy compound having a cyclohexane ring as an alicyclic structure and an alicyclic epoxy resin having a structural formula including a cyclohexene oxide structure is used as the gelling agent. Also, a nonaqueous electrolyte comprising a nonaqueous solvent including γ-butyrolactone and $LiBF_4$ dissolved in the nonaqueous solvent is contained in the gel electrolyte precursor. As a result, the phase of the crosslinked body obtained by the gelling agent is separated from the phase of the nonaqueous electrolyte so as to diminish the mutual function between the electrolyte and the crosslinked body, making it possible to permit the electrolyte to be migrated smoothly. It follows that it is possible to further improve the rate characteristics and the charge-discharge cycle characteristics of the battery.

In the gel electrolyte precursor used in the first chemical battery of the present invention, at least one compound selected from the group consisting of an epoxy compound having a cyclohexane ring as an alicyclic structure and an alicyclic epoxy resin having a structural formula including a cyclohexene oxide structure is used as the gelling agent. Also, at least one compound selected from the group consisting of $LiBF_4$ and $LiPF_6$ is used as a lithium salt contained in the electrolyte so as to permit the gelling agent noted above to be crosslinked by the function of the lithium salt. It follows that it is unnecessary to add a catalyst and a crosslinking agent to the gel electrolyte precursor, making it possible to avoid the side reactions caused by the catalyst and the catalyst and the crosslinking agent and avoid the lowering of the ionic conductivity caused by the catalyst and the crosslinking agent. As a result, it is possible to further improve the discharge capacity and the charge-discharge cycle characteristics of the secondary battery.

In the first chemical battery of the present invention, it is desirable for the gel electrolyte to be in contact with the positive electrode or the negative electrode so as to perform also the function of the adhesive layer. To be more specific, each of the epoxy compound having an alicyclic structure and at least one epoxy group in a single molecule and an alicyclic epoxy resin is capable of performing the function of an adhesive. Therefore, if the epoxy compound noted above is in contact with the electrode, it is possible to improve the adhesion force between the electrode and the gel electrolyte.

It is possible to arrange an adhesive layer between the electrode and the separator. In this case, it is possible to further increase the adhesion force, making it possible to decrease the thickness of the separator and to increase the porosity, leading to an improved battery performance. Also, it is possible to eliminate the adhesive layer.

The first chemical battery of the present invention comprises a hermetic vessel having an electrolyte retaining polymer, a positive electrode, a negative electrode, and an electrode lead housed therein, wherein said electrolyte retaining polymer is in contact with at least a part of said hermetic vessel or with at least a part of said electrode lead.

As described above, each of the epoxy compound described above and the alicyclic epoxy resin described above also performs the function of an adhesive layer. Therefore, it is possible to permit a hermetic vessel housing the electrode group to adhere strongly to the electromotive section of the battery by bringing the epoxy compound or the epoxy resin noted above into contact with the inner wall of the hermetic vessel.

In the second chemical battery of the present invention, used is a gel electrolyte precursor comprising a halogen-containing compound and a compound capable of reaction with the halogen-containing compound to form an onium salt, said compound having at least one element selected from the group consisting of N, P and S. At least one of the halogen-containing compound and the compound capable of reaction with the halogen-containing compound contains at least one compound selected from the compounds represented by chemical formula (16) to chemical formula (22). It is possible to obtain a gel electrolyte containing a polymer of an onium salt and an electrolyte by allowing the gel electrolyte precursor noted above to gel, said onium salt being formed by the reaction between the halogen-containing compound and the compound having at least one element selected from the group consisting of N, P and S.

If 0.1% to several % of the compound selected from the compounds represented by chemical formula (16) to chemical formula (22) is introduced into an organic solvent or another liquid, the self-organization is brought about by the hydrogen bond caused by the hydrogen atom contained in the amide bond or urea bond contained in the compound noted above so as to permit the liquid to gel. The gelled substance is generally called a physical gel. The bond generating the hydrogen bond is not limited to the amide bond and the urea bond. It is possible for the hydrogen atom contained in another bond to bring about the hydrogen bond. However, it is desirable to use a compound having an urea bond because the urea bond exhibits the highest gelling capability.

If the viscosity of the gel electrolyte precursor of the present invention is lowered by heating and, then, the precursor is cooled, a physical mutual function between the compounds, i.e., the self-organization of the compound, takes place. At the same time, an addition reaction is brought about between the compound containing element A described previously and the halogen-containing compound by the functional group capable of an addition reaction any time, which is contained in these compounds, so as to form a polymer, with the result that the gel electrolyte precursor is allowed to gel. Since the gel-like electrolyte thus obtained contains a polymer formed by the onium salt-forming reaction and a physical mutual function is generated among the polymer molecules, it is possible to avoid the phase transition of the gel into sol or liquid in accordance with the temperature elevation. It follows that it is possible to obtain a gel of a high stability capable of retaining the state of gel even if the temperature is elevated. It should also be noted that the gelling takes place even if the amount of the polymer is small, making it possible to improve the electrical conductivity of the gel electrolyte. As a result, it is possible to provide a chemical battery that exhibits an improved discharge capacity and improve charge-discharge cycle characteristics even under a high temperature environment.

In the first chemical battery and the second chemical battery of the present invention, it is desirable to interpose a spacer made of a porous body between the positive electrode and the negative electrode and to form an electrolyte retaining polymer within the spacer. By using the spacer, the mechanical strength is increased. Therefore, even if some force is applied from the outside, it is possible to prevent the short circuit between the positive and negative electrodes.

The first chemical battery and the second chemical battery of the present invention can be applied to a lithium ion secondary battery comprising a positive electrode containing a positive electrode active material containing a Li-containing oxide and a negative electrode containing a negative electrode active material capable of absorbing-desorbing lithium ions.

The manufacturing method of the first chemical battery of the present invention is featured in that a gel precursor is retained between a pair of a positive electrode and a negative electrode, followed by allowing the gel precursor to gel. The gel precursor contains an electrolyte retaining polymer component and an electrolyte, said polymer component containing an organic polymer having at least one element selected from the group consisting of nitrogen, phosphorus and sulfur, and an organic compound containing at least one halogen atom.

To be more specific, the manufacturing method of the present invention is featured in that the battery constituents other than the gel are assembled in advance, followed by pouring a gel precursor having a low viscosity into the clearance between the positive and negative electrodes and, after the gel precursor has been sufficiently permeated into the clearance between the electrodes and into the surface regions of the electrodes, allowing the gel precursor to gel so as to increase the viscosity.

The method of manufacturing the second chemical battery of the present invention is featured in that a gel precursor is retained in the clearance between the positive and negative electrodes, followed by allowing the gel precursor to gel. The gel precursor contains an electrolyte retaining polymer component containing a compound having at least one epoxy group within the molecule and an electrolyte.

Like the manufacturing method of the first chemical battery of the present invention, the manufacturing method of the second chemical battery is featured in that the battery constituents other than the gel are assembled in advance, followed by pouring a gel precursor having a low viscosity into the clearance between the positive and negative electrodes and, after the gel precursor has sufficiently permeated into the clearance between the electrodes and into the surface regions of the electrodes, allowing the gel precursor to gel so as to increase the viscosity.

It is also possible to allow the gelling agent constituting the electrolyte retaining polymer component in the gel electrolyte and the electrolyte to be contained successively in the clearance between the two electrodes. What should be noted is that, for injecting the gel precursor, it is unnecessary to inject the gel precursor prepared in advance into the clearance between the two electrodes. In other words, it is possible to inject the gelling agent and the electrolyte separately so as to prepare the gel precursor in the clearance between the two electrodes. Depending on the selected materials, it is possible for the crosslinking of the gelling agent to be started within the gel precursor at room temperature so as to increase the viscosity. In the case of using such materials, it is desirable to inject the gelling agent and the electrolyte separately into the clearance between the two electrodes.

It is also possible for the positive electrode, the negative electrode or the porous spacer interposed between the positive and negative electrodes to be coated or impregnated with the gel precursor, followed by laminating the positive electrode, the negative electrode and the spacer one upon the other and subsequently allowing the gel precursor impregnated in at least the spacer to gel.

Where the positive electrode or the negative electrode is coated or impregnated with the gel precursor, the gel oozes into the clearance between the positive and negative electrodes after the laminating step or after the battery preparation. Therefore, the gel can be prepared in the clearance between the positive and negative electrodes by allowing the gel precursor to gel after the lamination of the positive and negative electrodes. It should also be noted that the lamination can be performed without using the separator.

Further, the manufacturing method of the chemical battery of the present invention is featured in that the fine pores of the spacer are impregnated with the gel electrolyte precursor of the present invention, followed by allowing the impregnated precursor to gel. Alternatively, in the structure in which the spacer is not arranged, the gel precursor of the present invention is loaded in advance in the clearance between the positive and negative electrodes by, for example, coating the two electrodes with the gel precursor, followed by allowing the impregnated gel precursor to gel.

It should be noted that, since the gel electrolyte precursor is allowed to gel after the precursor permeates into the electrodes, it is possible to achieve a good contact state between the electrodes and the gel. Particularly, since the capability of an adhesive is imparted to the gel obtained in the case of using a compound having an epoxy group as the gelling agent, the gel exhibits an excellent adhesion force to the electrode, making it possible to prevent the problem that the gel is peeled off the electrode. Further, where the gel precursor is loaded in the battery case, the adhesion force between the battery case and the resultant gel is improved because the gel is brought into contact with the battery case.

For allowing the gel precursor to permeate the spacer or to be poured into the clearance between the two electrodes, it is possible to prepare first the gel precursor and, then, to perform the permeation or pouring of the prepared gel precursor, followed by irradiating the permeated or poured gel precursor with a predetermined energy beam so as to permit the precursor to gel. It should be noted, however, that the gelling reaction is started at room temperature depending on the kind of the gel precursor. Therefore, it is desirable to perform first permeation or pouring of one of the electrolyte retaining polymer component and the electrolyte, followed by performing permeation or pouring of the other.

Further, where the electrode is formed of a porous body as in a lithium ion secondary battery, it is possible to permit the gel precursor to permeate the electrode, followed by allowing the gel precursor oozing out of the electrode to gel so as to form a gel layer.

Preferred Examples of the present invention will now be described in detail. Needless to say, the technical scope of the present invention is not limited by these Examples.

EXAMPLES 1 TO 6 AND COMPARATIVE EXAMPLES 1 TO 6

Prepared was a gel electrolyte precursor containing a liquid nonaqueous electrolyte prepared by dissolving $LiBF_4$ in an amount of 1 mol/L in a mixed nonaqueous solvent consisting of 40% by volume of ethylene carbonate (EC) and 60% by volume of γ-butyrolactone (GBL). Table 1 shows the composition of the gel electrolyte precursor for each of Examples 1 to 6 and Comparative Examples 1 to 6. It should be noted that an electrolyte retaining polymer was not added to the gel electrolyte precursor for Comparative Example 1.

The gel electrolyte precursor for each of Examples 1 to 6 and Comparative Examples 1 to 6 was allowed to stand at 80° C. for 30 minutes to permit the precursor to gel, and the characteristics of the resultant gel were examined. Table 1 also shows the results. These characteristics were measured at 20° C. for each of Examples 1 to 5 and Comparative Examples 1 and 3 to 6 and at −20° C. for Example 6 and Comparative Example 2. In Table 1, the samples in which the gelling took place were denoted by "OK", and the sample in which the gelling did not take place was denoted by "none". Also, the samples in which the phase separation took place between the electrolyte and the polymer component were denoted by "separated", and samples in which the phase separation did not take place between the electrolyte and the polymer component were denoted by "none".

Also, the gel characteristics were measured after the samples were left to stand at room temperature for one day, with substantially the same results.

TABLE 1

| | Gel precursor | | | | | | | | |
|---|---|---|---|---|---|---|---|---|---|
| | | | Electrolyte retaining polymer component | | | | | | |
| | Nonaqueous solvent EC/GBL | Lithium salt LiBF4 | Diacrylic acid ester | Epoxy resin 1 | Epoxy resin 2 | Epoxy resin 3 | Epoxy resin 4 | Phenol novolak resin | Nadic anhydride |
| Examples | | | | | | | | | |
| 1 | 100 | 10 | — | 10 | — | — | — | — | — |
| 2 | 100 | 10 | — | — | 10 | — | — | — | — |
| 3 | 100 | 10 | — | 10 | — | — | — | — | — |
| 4 | 100 | 10 | — | — | 10 | — | — | — | — |
| 5 | 100 | 10 | — | 10 | — | — | — | — | — |
| 6 | 100 | 10 | — | 5 | — | — | — | — | — |
| Comparative Examples | | | | | | | | | |
| 1 | 100 | 10 | — | — | — | — | — | — | — |
| 2 | 100 | 10 | 40 | — | — | — | — | — | — |
| 3 | 100 | 10 | — | — | — | 40 | — | — | — |
| 4 | 100 | 10 | — | — | — | — | 40 | — | — |
| 5 | 100 | 10 | — | — | — | 40 | — | 30 | — |
| 6 | 100 | 10 | — | — | — | 40 | — | — | 30 |

| | Gel precursor | | | | | Characteristics | | |
|---|---|---|---|---|---|---|---|---|
| | Catalyst | | | | | | Ionic | |
| | Sl 60 | Al (acac) 3 | SH6 018 | Benzoyl peroxide | Imidazole | Gelling | Conductivity (mS/cm) | Phase separation |
| Examples | | | | | | | | |
| 1 | — | — | — | — | — | OK | 4 | Separated |
| 2 | — | — | — | — | — | OK | 2 | Separated |
| 3 | 1 | — | — | — | — | OK | 4 | Separated |
| 4 | — | 1 | 1 | — | — | OK | 2 | Separated |
| 5 | 1 | 1 | — | — | — | OK | 4 | Separated |
| 6 | — | — | — | 1 | — | OK | 0.5 | Separated |

TABLE 1-continued

| Comparative Examples | | | | | | | | | |
|---|---|---|---|---|---|---|---|---|---|
| 1 | — | — | — | — | — | None | 5 | None |
| 2 | — | — | — | — | — | OK | 0.01 | None |
| 3 | 1 | — | — | — | — | OK | 0.7 | None |
| 4 | — | — | — | — | 1 | OK | 0.5 | None |
| 5 | — | — | — | — | — | OK | 0.2 | None |
| 6 | — | — | — | — | — | OK | 0.09 | None |

Epoxy resin 1 given in Table 1 denotes the compound represented by chemical formula (24) given below, which is available on the market under the trade name of "Seloxide 2021" (produced by Dicel Corp., having an epoxy equivalent of 131 to 143 and a molecular weight of 260 to 300):

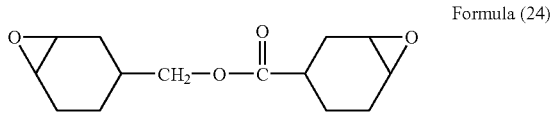

Formula (24)

Epoxy resin 2 given in Table 1 denotes the alicyclic epoxy resin represented by chemical formula (25) given below, which is available on the market under the trade name of "Seloxide 2081" (produced by Dicel Corp., having an epoxy equivalent of 100 to 200 and a molecular weight of 20 to 300):

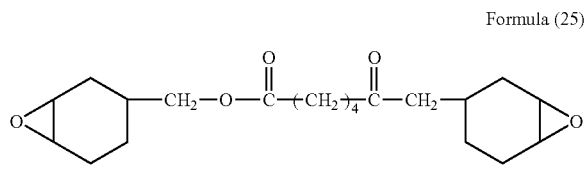

Formula (25)

Epoxy resin 3 given in Table 1 denotes the bisphenol A type epibis type epoxy resin available on the market under the trade name of "Epicoat 828" (produced by Yuka Shell Corp., having an epoxy equivalent of 184 to 194 and a molecular weight of 380).

Epoxy resin 4 given in Table 1 denotes the bisphenol A type epibis type epoxy resin available on the market under the trade name of "Epicoat 1001" (produced by Yuka Shell Corp., having an epoxy equivalent of 450 to 500 and a molecular weight of 900).

EC and GBL in Table 1 denote ethylene carbonate and γ-butyrolactone, respectively. "S160" denotes a sulfonium series cationic polymerization catalyst manufactured by Sanshin Kagaku K. K. "Al(acac)3" denotes aluminum trisacetyl acetonate complex. Further, "SH6018", given in Table 1 denotes a SiOH-containing silicone resin manufactured by Toray Silicone Inc.

As apparent from Table 1, the gel electrolyte precursor for each of Examples 1 to 5 using epoxy resin 1 or 2 having a cyclohexane ring is allowed to gel with a small amount of a gelling agent, i.e., not larger than 10% of the liquid nonaqueous electrolyte, compared with the gel electrolyte precursor for each of Comparative Examples 2 to 6. Further, the gel electrolyte precursor for each of the Examples 1 to 5 permits the phase separation between the liquid nonaqueous electrolyte and the polymer component in the gel electrolyte, and exhibits a high ionic conductivity, compared with Comparative Examples 2 to 6. Also, the gel electrolyte precursor for Example 6 is allowed to gel with a small amount of the gelling agent, i.e., 5% of the liquid nonaqueous electrolyte, and permits obtaining a high ionic conductivity even at a low temperature of −20° C.

The epoxy equivalent of the epoxy resin is measured by the method described on page 162 of "Epoxy Resin" compiled by Kakiuchi and published from Shokodo in 1977. Specifically, an excessive amount of hydrochloric acid is allowed to act on the epoxy group of the epoxy resin so as to generate chlorohydrin quantitatively. Then, the excess hydrochloric acid that did not react with the epoxy resin is measured by a chemical analysis or an IR method. The epoxy equivalent of the epoxy resin is calculated on the basis of the measured value.

Also, the molecular weight of the epoxy resin is measured by a gel permeation chromatography (GPC).

EXAMPLE 7

A liquid nonaqueous electrolyte was prepared by dissolving 2 mol/L of $LiBF_4$ in a mixed nonaqueous solvent consisting of 60% by volume of ethylene carbonate (EC) and 40% by volume of γ-butyrolactone. Then, a gel electrolyte precursor was obtained by dissolving 3 g of a compound represented by chemical formula (16), in which $R^1$ represents pyridyl group represented by chemical formula (26) given below, $R^2$ represents —$CH_2$—O—, $R^3$ represents sec-butyl group, and $R^4$ represents octadecane group, and 3 g of dibromohexane in 100 g of the liquid nonaqueous electrolyte thus' prepared.

Formula (26)

EXAMPLE 8

A gel electrolyte precursor was obtained by dissolving 3 g of a compound represented by chemical formula (17), in which $R^1$ represents pyridyl group, $R^{1'}$ represents pyridyl group, $R^5$ represents —$CH_2$—O—, $R^6$ represents —$CH_2$—O—, $R^7$ represents ethylene group, $R^8$ represents isopropyl group, and $R^9$ represents —$CH_2$—O—, and 3 g of dibromonpentane in 100 g of the liquid nonaqueous electrolyte of the composition similar to that of the liquid nonaqueous electrolyte prepared in Example 7.

EXAMPLE 9

A gel electrolyte precursor was obtained by dissolving 3 g of a compound represented by chemical formula (18), in which $R^1$ represents pyridyl group, $R^{10}$ represents octyl group, and $R^{11}$ represents —(C=O)—, and 3 g of dibromopentane in 100 g of the liquid nonaqueous electrolyte of the composition similar to that of the liquid nonaqueous electrolyte prepared in Example 7.

EXAMPLE 10

A gel electrolyte precursor was obtained by dissolving 3 g of a compound represented by chemical formula (19), in which $R^1$ represents chlorine, $R^{1'}$ represents chlorine, $R^{12}$ represents —$C_{11}H_{22}$—, and $R^{13}$ represents —$C_{11}H_{22}$—, and 3 g of 4,4'-dipyridyl in 100 g of the liquid nonaqueous electrolyte of the composition similar to that of the liquid nonaqueous electrolyte prepared in Example 7.

EXAMPLE 11

A gel electrolyte precursor was obtained by dissolving 6 g of a compound represented by chemical formula (20), in which $R^1$ represents pyridyl group, $R^{1'}$ represents pyridyl group, $R^{14}$ represents —(C=O)—, $R^{15}$ represents —(C=O)—, $R^{16}$ represents —$C_{10}H_{20}$—, and $R^{17}$ represents —$C_{10}H_{20}$—, and 6 g of tetrakis (bromomethyl) benzene in 100 g of the liquid nonaqueous electrolyte of the composition similar to that of the liquid nonaqueous electrolyte prepared in Example 7.

EXAMPLE 12

A gel electrolyte precursor was obtained by dissolving 6 g of a compound represented by chemical formula (21), in which $R^1$ represents chlorine, $R^{1'}$ represents chlorine, $R^{18}$ represents —$C_{10}H_{20}$—, and $R^{19}$ represents —$C_{10}H_{20}$—, and 6 g of 4,4'-bipyridine in 100 g of the liquid nonaqueous electrolyte of the composition similar to that of the liquid nonaqueous electrolyte prepared in Example 7.

EXAMPLE 13

A gel electrolyte precursor was obtained by dissolving 6 g of a compound represented by chemical formula (22), in which $R^1$ represents chlorine, $R^{1'}$ represents chlorine, $R^{20}$ represents —$C_{10}H_{20}$—, $R^{21}$ represents —$C_6H_{12}$—, and $R^{22}$ represents —$C_{10}H_{20}$—, and 6 g of terpyridyl in 100 g of the liquid nonaqueous electrolyte of the composition similar to that of the liquid nonaqueous electrolyte prepared in Example 7.

The gel electrolyte precursor obtained in each of Examples 7 to 13 was allowed to gel by the heating at 80° C. for 30 minutes, and the ionic conductivity (mS/cm) and the occurrence of the phase separation in the resultant gel electrolyte were measured at 20° C., with the results as shown in Table 2.

COMPARATIVE EXAMPLES 7 TO 10

The composition, gelling, conductivity and phase separation of the onium series gel precursor for Comparative Examples 7 to 10 are shown in Table 3.

TABLE 2

| | | | Gel precursor | | | |
|---|---|---|---|---|---|---|
| | | | Electrolyte retaining polymer component | | | |
| Examples | Nonaqueous solvent EC/GBL | Lithium salt LiBF4 | Compound containing N, P, S | Mixing amount | Halogen-containing compound | Mixing amount |
| 7 | 100 | 10 | Chemical formula (16) | 3 | Dibromohexane | 3 |
| 8 | 100 | 10 | Chemical formula (17) | 3 | Dichloropropane | 3 |
| 9 | 100 | 10 | Chemical formula (18) | 3 | Dibromopentane | 3 |
| 10 | 100 | 10 | 4,4'-bipyridyl | 3 | Chemical formula (19) | 3 |
| 11 | 100 | 10 | Chemical formula (20) | 6 | Tetrakis(bromomethyl)benzene | 6 |
| 12 | 100 | 10 | 4,4'-bipyridyl | 6 | Chemical formula (21) | 6 |
| 13 | 100 | 10 | Terpyridyl | 6 | Chemical formula (22) | 6 |

| | | Characteristics | |
|---|---|---|---|
| Examples | Gelling | Ionic conductivity (mS/cm) | Phase separation |
| 7 | OK | 5 | Separate |
| 8 | OK | 5 | Separate |
| 9 | OK | 5 | Separate |
| 10 | OK | 4 | Separate |
| 11 | OK | 5 | Separate |
| 12 | OK | 5 | Separate |
| 13 | OK | 4 | Separate |

TABLE 3

| Comparative Examples | Gel precursor | | | | | | |
|---|---|---|---|---|---|---|---|
| | Nonaqueous solvent EC/GBL | Lithium salt LiBF4 | Electrolyte retaining polymer component | | | | |
| | | | Diethylamino ethyl methacrylate | Amino ethyl acrylamide | Diethylamino ethyl styrene | Polymer A | |
| 7 | 100 | 10 | 5 | — | — | — | |
| 8 | 100 | 10 | — | 5 | — | — | |
| 9 | 100 | 10 | — | — | 5 | — | |
| 10 | 100 | 10 | — | — | — | 5 | |

| Comparative Examples | Gel precursor Electrolyte retaining polymer component | | | Characteristics | | |
|---|---|---|---|---|---|---|
| | Dibromohexane | Dibromododecane | Tetrabromo | Gelling | Ionic Conductivity (mS/cm) | Phase separation |
| 7 | 5 | — | — | OK | 0.3 | None |
| 8 | 5 | — | — | OK | 0.1 | None |
| 9 | — | 5 | — | OK | 1 | Separate |
| 10 | — | — | 5 | OK | 0.5 | None |

As apparent from Tables 2 and 3, the gel electrolyte precursor for each of Examples 7 to 13, in which an onium salt is formed by using the compound represented by any of chemical formula (16) to chemical formula (22), is allowed to gel with a small addition amount of about 10% of the gelling agent. Also, the gel electrolyte for each of Examples 7 to 13 exhibits an electrical conductivity not lower than about 0.1 mS/cm at room temperature so as to provide an excellent solid electrolyte.

EXAMPLE 14

A gel electrolyte precursor was obtained as in Example 3, except that triphenyl sulfonium hexafluorophosphate was used as a catalyst in place of the thermosetting type sulfonium salt based catalyst available on the market under the trade name "S160" (manufactured by Sanshin Kagaku K.K.). A polyethylene cloth was coated and impregnated with the resultant electrolyte precursor, followed by irradiating the impregnated polyethylene cloth with an electron beam of 200 $\mu C/cm^2$ under an accelerating energy of 150 keV. After the electron beam irradiation, the polyethylene cloth was left to stand at room temperature for one hour so as to obtain a gel material. The gel material thus obtained was found to exhibit a high conductivity of 5 mS/cm.

EXAMPLE 15

A gel electrolyte precursor was obtained as in Example 3, except that triphenyl sulfonium was used as a catalyst in place of the thermosetting type sulfonium salt based catalyst available on the market under the trade name "S160" (manufactured by Sanshin Kagaku K.K.). A polyethylene cloth was coated and impregnated with the resultant electrolyte precursor, followed by irradiating the impregnated polyethylene cloth with 500 $mJ/cm^2$ of light emitted from a high pressure mercury lamp of 500 W. After the light irradiation, the polyethylene cloth was left to stand at room temperature for one hour so as to obtain a gel material. The gel material thus obtained was found to exhibit a high conductivity of 6 mS/cm.

EXAMPLE 16

A negative electrode having a copper foil having a thickness of 10 μm, which was used as a negative electrode current collector, and a negative electrode active material layer having a thickness of 100 μm and containing a mixture consisting of a carbon powder having an average particle diameter of 1 μm and a PVdF resin, was prepared. Also, a positive electrode having a positive electrode active material layer having a thickness of 100 μm and containing a mixture consisting of a calcined material of a lithium-containing cobalt oxide and a PVdF resin, and an aluminum foil having a thickness of 15 μm, which was used as a positive electrode current collector, was prepared. Also prepared was a polyethylene separator having a thickness of 50 μm and an air permeability of 500 seconds/100 $cm^3$.

An electrode group was prepared by spirally winding a laminate structure consisting of the positive electrode, the negative electrode and the separator interposed between the positive electrode and the negative electrode. The electrode group thus prepared was housed in a cylindrical metal vessel having a bottom, followed by pouring the gel electrolyte precursor similar to that described in Example 1 into the cylindrical metal vessel. Finally, a sealing treatment was applied to the vessel so as to assemble a cylindrical lithium ion secondary battery (20 cm×30 cm) constructed as shown in FIG. 1.

The secondary battery thus prepared was left to stand at 50° C. for 24 hours so as to permit the gel electrolyte precursor to gel. A charge-discharge cycle test was applied to the secondary battery thus obtained such that the battery was charged for 2.5 hours to 4.2V with a charging current of 1 A, followed by discharging the battery with a discharging current of 1 A to 2.7V so as to measure the discharge capacity of the battery. The discharge capacity for the first cycle was compared with that for the $300^{th}$ cycle. The capacity reduction at the $300^{th}$ cycle relative to the first cycle was found to be 5%.

COMPARATIVE EXAMPLE 11

A cylindrical lithium ion secondary battery was assembled as in Example 16, except that the electrode group was impregnated with the liquid nonaqueous electrolyte alone in place of the gel electrolyte precursor. A charge-discharge cycle test was applied to the secondary battery thus prepared as in Example 16, so as to measure the discharge capacity of the battery. The capacity reduction at the 300$^{th}$ cycle relative to the first cycle was found to be 40%.

EXAMPLE 17

The surface of a polyethylene separator having a thickness of 50 μm was coated with a gel electrolyte precursor similar to that prepared in Example 1. Then, an electrode group was prepared by spirally winding a laminate structure consisting of the positive electrode similar to that used in Example 16, the negative electrode similar to that used in Example 16, and the separator interposed between the positive electrode and the negative electrode. The electrode group thus prepared was housed in a cylindrical metal vessel having a bottom, followed by applying a sealing treatment to the vessel so as to obtain a cylindrical lithium ion secondary battery (20 cm×30 cm) constructed as shown in FIG. 1.

The secondary battery thus prepared was left to stand at 50° C. for 24 hours so as to permit the gel electrolyte precursor to gel. A charge-discharge cycle test was applied to the secondary battery thus obtained as in Example 16 so as to measure the discharge capacity of the battery. The discharge capacity for the first cycle was compared with that for the 300$^{th}$ cycle. The capacity reduction at the 300$^{th}$ cycle relative to the first cycle was found to be 10%.

The secondary battery for each of Examples 16 and 17 was dismantled. It has been found concerning the secondary battery for Example 16 that the gel electrolyte was retained inside the positive electrode, the negative electrode and the separator, and that the gel electrolyte was dispersed in the interface between the positive electrode and the separator and in the interface between the negative electrode and the separator. On the other hand, it has been found concerning the secondary battery for Example 17 that the gel electrolyte layer was interposed between the positive electrode and the separator and between the negative electrode and the separator. In the secondary battery for each of Examples 16 and 17, the gel electrolyte was found to retain a sufficiently large amount of the liquid electrolyte.

Also, the secondary battery for Example 16 was dismantled after the 300$^{th}$ cycle of the charge-discharge cycle test. Peeling between the electrode and the separator was not recognized. Also, a high bonding strength of 5 kg/cm$^2$ was found between the electrode and the separator.

EXAMPLE 18

<Preparation of Positive Electrode>

A slurry was prepared by adding 3.5% by weight of acetylene black, 3.5% by weight of graphite, 2% by weight of ethylene propylene diene monomer powder and toluene to 91% by weight of lithium cobalt oxide represented by Li$_x$CoO$_2$, the molar ratio x being: 0<x<1, and stirring the resultant mixture. Then, both surfaces of a current collector formed of an aluminum foil having a thickness of 15 μm and provided with holes each having a diameter of 0.5 mm at a rate of 10 holes per 10 cm$^2$ were coated with the resultant slurry, followed by drying and pressing the current collector so as to obtain a positive electrode having an electrode density of 3 g/cm$^3$ and constructed that an active material-containing layer was formed on each surface of the current collector.

<Preparation of Negative Electrode>

Prepared as a carbonaceous material was a mesophase pitch based carbon fiber heat treated at 3,000° C. The mesophase pitch based carbon fiber was found to have an average fiber diameter of 8 μm, an average fiber length of 20 μm, and 0.3360 nm of the interplanar spacing d$_{002}$ derived from (002) reflection, which was determined by the X-ray diffractometry. A slurry was prepared by mixing 93% by weight of the mesophase based carbon fiber powder, 7% by weight of polyvinylidene fluoride (PVdF) used as a binder, and N-methyl-2-pyrrolidone (NMP). Then, a current collector formed of a copper foil having a thickness of 15 μm and provided with holes each having a diameter of 0.5 mm at a rate of 10 holes per 10 cm$^2$ was coated with the resultant slurry, followed by drying and pressing the current collector so as to obtain a negative electrode having an electrode density of 1.3 g/cm$^3$ and constructed that a negative electrode layer was formed on the surface of the current collector.

<Separator>

A polyethylene porous film having a thickness of 25 μm, a thermal shrinkage of 20% at 120° C. for one hour, and a porosity of 50% was prepared as the separator.

<Gel Electrolyte Precursor>

A mixed solvent was prepared by mixing ethylene carbonate (EC), γ-butyrolactone (BL), an epoxy resin represented by CH$_2$=C(CH$_3$)—COO—CH$_2$-(CycHexOxide), "CycHexOxide" denoting cyclohexene oxide structure and the epoxy resin having an epoxy equivalent of 200 and a molecular weight of 200, and cyclohexene oxide having an epoxy equivalent of 100 and a molecular weight of 100, at a volume ratio of 20:70:5:5. Then, 1.5 mol/L of LiBF$_4$ was dissolved in the resultant mixed solvent. Further, a gel electrolyte precursor was prepared by adding 0.5% by weight of dibenzoyl peroxide, 0.5% by weight of ethylacetoacetado diisopropyloxy aluminum, and 0.5% by weight of diphenyl silane diol.

<Assembly of Battery>

A band-like positive electrode lead wire was welded to the current collector of the positive electrode. Also, a band-like negative electrode lead wire was welded to the current collector of the negative electrode. Then, a separator was interposed between the positive electrode and the negative electrode to form a laminate structure, followed by spirally winding the laminate structure and, then, flattening the wound laminate structure so as to prepare an electrode group.

On the other hand, a laminate film consisting of an aluminum foil and polypropylene films formed on both surfaces of the aluminum foil was formed into a bag, followed by housing the electrode group noted above in the bag such that it was possible to observe the laminate face of the electrode group from the opening of the bag. Also, 0.3% by weight of polyvinylidene fluoride, which is an adhesive polymer, was dissolved in an organic solvent of dimethyl formamide. The resultant solution was poured into the electrode group housed in the laminate film such that the amount of the solution would be 0.2 mL per 100 mAh of the battery capacity so as to permit the solution to permeate inside the electrode group and to be attached to the entire surface of the electrode group.

Then, a vacuum drying was applied to the electrode group housed in the laminate film at 80° C. for 12 hours so as to evaporate the organic solvent.

In this electrode group, the adhesive polymer was held in each of the void of the positive electrode, the void of negative electrode, and the void of separator. A porous adhesive layer was formed on the surfaces of the electrode group. The total amount of PVdF was found to be 0.6 mg per 100 mAh of the battery capacity.

The gel electrolyte precursor described above was poured into the electrode group within the laminate film in an amount of 5.0 g per 1 Ah of the battery capacity, followed by applying a sealing treatment and, then, a heat treatment at 80° C. for one hour so as to assemble a thin type lithium ion secondary battery constructed as shown in FIG. 2 and having a thickness of 3 mm, a width of 40 mm, and a height of 70 mm.

An initial charging treatment was applied to the secondary battery thus prepared. In the first step, the secondary battery was left to stand under a high temperature environment of 40° C. for 5 hours and, then, the battery was charged under a constant voltage and a constant current for 10 hours at 0.2 C (120 mA) until the battery voltage was increased to 4.2V. Then, the battery was discharged at 0.2 C until the battery voltage was lowered to 2.7V. Further, the secondary battery was charged under the conditions equal to those for the first cycle so as to manufacture the secondary battery.

The internal impedance of the secondary battery thus prepared, which was measured under 1 kHz, was found to be 90 mΩ. Also, the capacity retention rate for the discharge at 2 C, which was measured under room temperature in order to look into the large current discharge characteristics, was found to be 87%. Further, in order to look into the charge-discharge cycle characteristics, a charge-discharge cycle was repeated such that the battery was charged for 3 hours at 0.5 C under a constant voltage and a constant current until the battery voltage was increased to 4.2V, followed by discharging the battery at 1 C until the battery voltage was lowered to 2.7V. The capacity retention rate after 300 cycles was found to be 90%. Also, the battery after the charging to 4.2V was stored under a high temperature of 80° C. for 150 hours in an attempt to measure the swelling of the battery. However, swelling was not recognized.

EXAMPLE 19

<Preparation of Gel Electrolyte Precursor>

A mixed solvent was prepared by mixing ethylene carbonate (EC), γ-butyrolactone (BL), an epoxy resin having a structural formula of (CycHexOxide)-COO—CH$_2$-(CycHexOxide) having an epoxy equivalent of 131 to 143 and a molecular weight of 260 to 300 and a hydrogenated epoxy resin represented by Gly-O-CycHex-C(CH$_3$)$_2$-CycHex-O-Gly, where "Gly" denotes a glycidyl group and "CycHex" denotes a cyclohexyl group, having an epoxy equivalent of 175 and a molecular weight of 350 at a mixing ratio by volume of 20:70:5:5. Then, a gel electrolyte precursor was prepared by dissolving 1.5 mol/L of LiBF$_4$ in the resultant mixed solvent.

<Assembly of Secondary Battery>

An electrode group was prepared as in Example 18. After the electrode group was housed in a bag of a laminate film similar to that used in Example 18, the gel electrolyte precursor was poured into the electrode group in an amount of 5.0 g per 1 Ah of the battery capacity, followed by applying a sealing treatment and, then, a heat treatment at 80° C. for one hour so as to assemble a thin type lithium ion secondary battery constructed as shown in FIG. 2 and having a thickness of 3 mm, a width of 40 mm and a height of 70 mm.

The internal impedance of the secondary battery thus prepared, which was measured under 1 kHz, was found to be 85 mΩ. Also, the capacity retention rate for the discharge at 2 C, which was measured under room temperature in order to look into the large current discharge characteristics, was found to be 90%. Further, in order to look into the charge-discharge cycle characteristics, a charge-discharge cycle was repeated such that the battery was charged for 3 hours at 0.5 C under a constant voltage and a constant current until the battery voltage was increased to 4.2V, followed by discharging the battery at 1 C until the battery voltage was lowered to 2.7V. The capacity retention rate after 300 cycles was found to be 90%. Also, the battery after the charging to 4.2V was stored under a high temperature of 80° C. for 150 hours in an attempt to measure the swelling of the battery. However, swelling was not recognized.

EXAMPLE 20

A polyethylene porous film having a thickness of 25 μm, a thermal shrinkage under 120° C. for one hour of 20% and a porosity of 50% was prepared as a separator. The separator thus prepared was impregnated with the gel electrolyte precursor for Example 1. Also, a band-like positive electrode lead wire was welded to the current collector of a positive electrode, and a band-like negative electrode lead wire was welded to the current collector of a negative electrode. Then, the positive electrodes and the negative electrodes were laminated one upon the other with the separator impregnated with the gel electrolyte precursor interposed between the adjacent positive electrode and negative electrode so as to prepare an electrode group of a lamination type.

A laminate film having a thickness of 100 μm and comprising an aluminum foil and polypropylene films laminated on both surfaces of the aluminum foil was formed into a bag and the electrode group prepared as above was housed in the bag, followed by applying a sealing treatment and, then, a heat treatment at 80° C. for one hour so as to prepare a thin type lithium ion secondary battery constructed as shown in FIG. 2 and having a thickness of 3 mm, a width of 40 mm and a height of 70 mm.

An initial charging treatment was applied to the secondary battery thus prepared. In the first step, the secondary battery was left to stand under a high temperature environment of 40° C. for 5 hours and, then, the battery was charged under a constant voltage and a constant current for 10 hours at 0.2 C (129 mA) until the battery voltage was increased to 4.2V. Then, the battery was discharged at 0.2 C until the battery voltage was lowered to 2.7V. Further, the secondary battery was charged under the conditions equal to those for the first cycle so as to manufacture the secondary battery.

Further, in order to look into the charge-discharge cycle characteristics, a charge-discharge cycle was repeated such that the battery was charged for 3 hours at 0.5 C under a constant voltage and a constant current until the battery voltage was increased to 4.2V, followed by discharging the battery at IC until the battery voltage was lowered to 2.7V. The capacity retention rate after 300 cycles was found to be 90%. Also, the battery after the charging to 4.2V was stored under a high temperature of 80° C. for 150 hours in an attempt to measure the swelling of the battery. However, swelling was not recognized.

EXAMPLE 21

An electrode group was prepared as in Example 20, followed by applying a forming treatment at 80° C. for one hour. Then, the electrode group was housed in a bag formed of a laminate sheet, followed by applying a sealing treatment. Further, an initial charging treatment was applied as in Example 20 so as to manufacture a thin film lithium ion secondary battery. The secondary battery thus manufactured exhibited charge-discharge characteristics substantially equal to those obtained in Example 20.

EXAMPLE 22

<Preparation of Gel Electrolyte>

A mixed solvent was prepared by mixing ethylene carbonate (EC), γ-butyrolactone (BL), an epoxy resin having a chemical structure represented by chemical formula (27) given below and a hydrogenated epoxy resin having a chemical structure represented by chemical formula (28) given below, in a mixing ratio of 550:44:3:3. Then, 1 mol/L of LiBF$_4$ was dissolved in the resultant mixed solvent so as to obtain a gel electrolyte precursor.

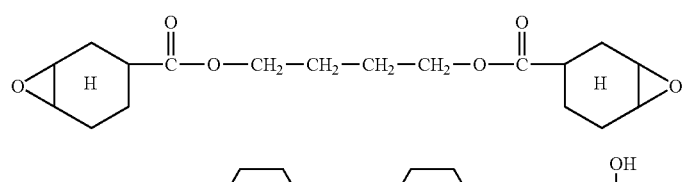

Formula (27)

-continued

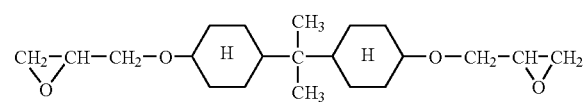

Formula (28)

EXAMPLE 23

<Preparation of Gel Electrolyte>

A mixed solvent was prepared by mixing ethylene carbonate (EC), γ-butyrolactone (BL), an epoxy resin having a chemical structure represented by chemical formula (29) given below and a hydrogenated epoxy resin having a chemical structure represented by chemical formula (30) given below in a mixing ratio of 43:50:4:3. Then, 1 mol/L of LiBF$_4$ was dissolved in the resultant mixed solvent so as to obtain a gel electrolyte precursor.

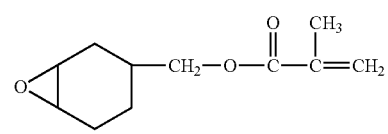

Formula (29)

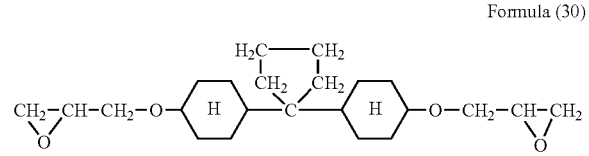

Formula (30)

EXAMPLE 24

<Preparation of Gel Electrolyte>

A mixed solvent was prepared by mixing ethylene carbonate (EC), γ-butyrolactone (BL), an epoxy resin having a chemical structure represented by chemical formula (31) given below and a hydrogenated epoxy resin having a chemical structure represented by chemical formula (32) given below in a mixing ratio of 54:40:3:3. Then, 2 mol/L of LiBF$_4$ was dissolved in the resultant mixed solvent so as to obtain a gel electrolyte precursor.

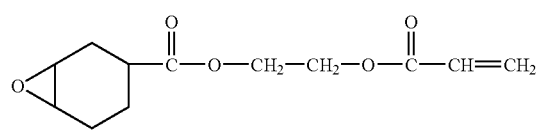

Formula (31)

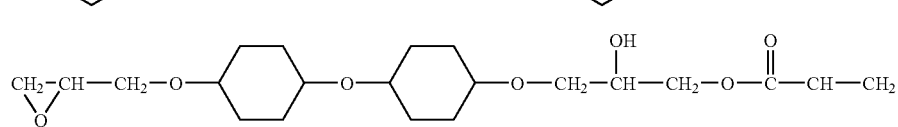

Formula (32)

EXAMPLE 25

<Preparation of Gel Electrolyte>

A mixed solvent was prepared by mixing ethylene carbonate (EC), γ-butyrolactone (BL), an epoxy resin having a chemical structure represented by chemical formula (33) given below, and another epoxy resin having a chemical structure represented by chemical formula (34) given below in a mixing ratio of 40:50:5:5. Then, 1 mol/L of LiBF$_4$ was dissolved in the resultant mixed solvent. Further, 0.5% by weight each of AIBN (azo bis iso butyronitrile) and a catalyst having a chemical structure represented by chemical formula (35) were added to the resultant solution so as to obtain a gel electrolyte precursor.

Formula (33)
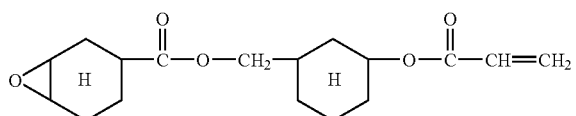

Formula (34)
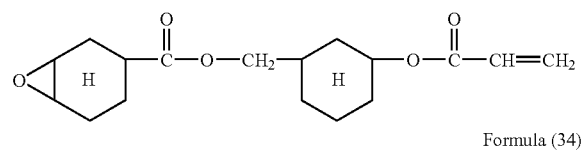

Formula (35)
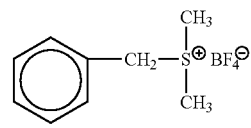

EXAMPLE 26

<Preparation of Gel Electrolyte>

A mixed solvent was prepared by mixing ethylene carbonate (EC), γ-butyrolactone (BL), an epoxy resin having a chemical structure represented by chemical formula (36) given below and another epoxy resin having a chemical structure represented by chemical formula (37) given below in a mixing ratio of 40:55:2:3. Then, 1 mol/L of LiBF$_4$ was dissolved in the resultant mixed solvent. Further, 0.5% by weight each of BPO (t-butyl benzoyl peroxide) and a catalyst having chemical structure represented by chemical formula (38) were added to the resultant solution so as to obtain a gel electrolyte precursor.

Formula (36)
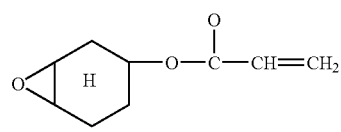

Formula (37)
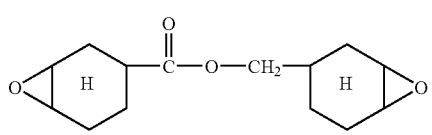

Formula (38)
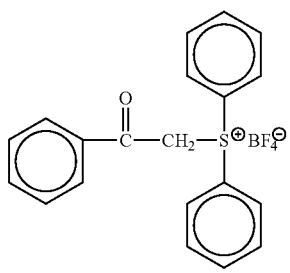

EXAMPLE 27

<Preparation of Gel Electrolyte>

A mixed solvent was prepared by mixing ethylene carbonate (EC), γ-butyrolactone (BL), an epoxy resin having a chemical structure represented by chemical formula (39) given below, and another epoxy resin having a chemical structure represented by chemical formula (40) given below in a mixing ratio of 40:50:5:5. Then, 1 mol/L of LiBF$_4$ was dissolved in the resultant mixed solvent. Further, 0.5% by weight each of BPO (t-butyl benzoyl peroxide) and a catalyst having a chemical structure represented by chemical formula (41) were added to the resultant solution so as to obtain a gel electrolyte precursor.

Formula (39)
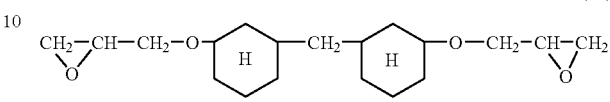

Formula (40)

Formula (41)

EXAMPLE 28

<Preparation of Gel Electrolyte>

A mixed solvent was prepared by mixing ethylene carbonate (EC), γ-butyrolactone (BL), and epoxy resin 1 equal to that used in Example 1 in a mixing ratio of 40:55:5. Then, 1 mol/L of LiPF$_6$ was dissolved in the resultant mixed solvent so as to obtain a gel electrolyte precursor.

EXAMPLE 29

<Preparation of Gel Electrolyte>

A mixed solvent was prepared by mixing ethylene carbonate (EC), γ-butyrolactone (BL), and epoxy resin 2 equal to that used in Example 2 in a mixing ratio of 40:50:10. Then, 1 mol/L of LiPF$_6$ was dissolved in the resultant mixed solvent so as to obtain a gel electrolyte precursor.

The gel electrolyte precursor obtained in each of Examples 22 to 29 was subjected to a heat treatment at 80° C. for 30 minutes so as to permit the precursor to gel. The ionic conductivity of the gel electrolyte thus obtained was measured, with the result as shown in Table 4. Also, it has been confirmed whether or not the gel electrolyte was separated into the liquid nonaqueous electrolyte phase and the polymer component phase. The samples in which the phase separation took place are denoted by "separated" in Table 4. Also, the samples in which the phase separation did not take place are denoted by "none" in Table 4.

Further, a thin type lithium ion secondary battery was manufactured as in Example 19 by using the gel electrolyte precursor prepared in each of Examples 1, 2, 4-6, 14, 15, 22-29 and Comparative Examples 1-6.

Also, a charge-discharge cycle test was applied to the secondary battery thus obtained such that the battery was charged for 2.5 hours to 4.2V with a charging current of 1 A, followed by discharging the battery with a discharging current of 1 A to 2.7V so as to measure the discharge capacity of the battery. The discharge capacity for the first cycle was compared with that for the 300$^{th}$ cycle. The capacity reduction at the 300$^{th}$ cycle relative to the first cycle was measured. Table 4 also shows the results.

TABLE 4

|  | Ionic conductivity (mS/cm) | Phase separation | Capacity reduction rate at 300 cycles |
|---|---|---|---|
| Example 1 | 5 | Separate | 2 |
| Example 2 | 4 | Separate | 3 |
| Example 4 | 5 | Separate | 5 |
| Example 5 | 4 | Separate | 5 |
| Example 6 | 2 | Separate | 5 |
| Example 7 | 3 | Separate | 5 |
| Example 8 | 4 | Separate | 5 |
| Example 9 | 4 | Separate | 5 |
| Example 14 | 3 | Separate | 4 |
| Example 15 | 3 | Separate | 5 |
| Example 22 | 2 | Separate | 4 |
| Example 23 | 2 | Separate | 4 |
| Example 24 | 3 | Separate | 4 |
| Example 25 | 4 | Separate | 5 |
| Example 26 | 4 | Separate | 4 |
| Example 27 | 5 | Separate | 4 |
| Example 28 | 5 | Separate | 4 |
| Example 29 | 4 | Separate | 5 |
| Comparative Example 1 | 0.6 | None | 50 |
| Comparative Example 2 | 0.5 | None | 50 |
| Comparative Example 3 | 0.3 | None | 40 |
| Comparative Example 4 | 0.5 | None | 50 |
| Comparative Example 5 | 0.2 | None | 40 |
| Comparative Example 6 | 0.1 | None | 40 |

As apparent from Table 4, the gel electrolyte for each of Examples 1, 2, 4-6, 14, 15, and 22-29 was separated into the liquid nonaqueous electrolyte phase and the polymer component phase. In addition, the ionic conductivity for each of these Examples was higher than that for Comparative Examples 1 to 6. Also, the secondary battery for each of Examples 1, 2, 4-6, 14, 15, and 22-29 was found to be capable of suppressing the swelling during storage under high temperatures and also found to be superior in the charge-discharge cycle life to the secondary battery for each of Comparative Examples 1 to 6.

As described above in detail, the present invention provides a gel electrolyte precursor that can be permitted to gel with a small amount of a gelling agent. The present invention makes it possible to lower the viscosity of the gel electrolyte precursor so as to increase the permeability of the precursor into the electrode, with the result that the resultant gel electrolyte is strongly bonded to the electrode.

The present invention also provides a chemical battery. In the chemical battery of the present invention, it is possible to increase the ionic conductivity of the gel electrolyte. It is also possible to increase the adhesion force between the electrode and the gel electrolyte. As a result, the present invention permits improving the large current discharge characteristics and the charge-discharge cycle life of the chemical battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A chemical battery, comprising:
    a positive electrode,
    a negative electrode, and
    a gel electrolyte comprising a crosslinked body and an electrolyte, said crosslinked body containing an epoxy compound that has a structural formula represented by chemical formula (6) given below:

Formula (6)

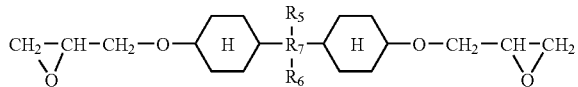

where $R_5$ represents a substituent selected from the group consisting of hydrogen atom and an alkyl group, $R_6$ represents a substituent selected from the group consisting of a hydrogen atom and an alkyl group, $R_7$ represents C when $R_5$ and $R_6$ are present, and $R_7$ represents a substituent selected from the group consisting of O, SO$_2$, and CO when $R_5$ and $R_6$ are not present.

* * * * *